United States Patent [19]

Onitsuka

[11] Patent Number: 5,628,660
[45] Date of Patent: May 13, 1997

[54] BONDING APPARATUS AND BONDING METHOD OF DEVICES

[75] Inventor: Yasuto Onitsuka, Fukuoka, Japan

[73] Assignee: Matsushita Electric Industrial Co., Ltd., Osaka, Japan

[21] Appl. No.: 429,871

[22] Filed: Apr. 27, 1995

[30] Foreign Application Priority Data

Apr. 28, 1994 [JP] Japan ................... 6-091401

[51] Int. Cl.$^6$ .................................................. H05K 3/30
[52] U.S. Cl. ................... 445/24; 228/6.2; 228/9; 228/105
[58] Field of Search ................... 228/6.2, 9, 105; 445/24

[56] References Cited

U.S. PATENT DOCUMENTS

| | | | |
|---|---|---|---|
| 4,501,064 | 2/1985 | Di Nozzi et al. | 228/6.2 |
| 4,934,578 | 6/1990 | Fritsch | 228/6.2 |

FOREIGN PATENT DOCUMENTS 3-217033  9/1991  Japan.

Primary Examiner—Kenneth J. Ramsey
Attorney, Agent, or Firm—McDermott, Will & Emery

[57] ABSTRACT

To present means for bonding two types of devices on a display panel at high speed and at high precision.

A first feed section comprising first devices and a second feed section comprising second devices are provided. Among the display panel, first feed section, and second feed section, a turntable comprising a first nozzle for picking up first devices and a second nozzle for picking up second devices is provided.

Between the turntable and display panel, a first head for bonding the first device sucked in vacuum to the first nozzle to a longer side of the display panel, and a second head for bonding the second device sucked in vacuum to the second nozzle to a shorter side of the display panel are provided.

24 Claims, 20 Drawing Sheets

BONDING APPARATUS AND BONDING METHOD OF DEVICES

BACKGROUND OF THE INVENTION

The present invention relates to a bonding apparatus and a bonding method of devices for bonding electrodes or leads of devices on electrodes of a display panel.

A liquid crystal panel or the like is used as a display panel for a display in electronic appliances. The display panel is assembled by bonding electrodes of the devices, a which are drivers for driving the display panel, on the electrodes formed at plural marginal bonding positions of a display panel made of glass plate or the like. As for the devices, tape carrier packages (TCPs), manufactured by a tape automated bonding (TAB) method, are generally used. The TAB method is used to obtain or fabricate TCPs by forming leads or electrodes of conductive material on the surface of a film carrier, bonding the chips cut out from a wafer on the leads, and blanking the outer lead portions of the leads by a cutting apparatus. The film carrier is formed of an ultrathin synthetic resin film of polyimide or the like.

Various types of apparatus of for bonding the outer leads, which are electrodes, of TCPs on the electrodes of the display panel are proposed.

For example, in the bonding apparatus disclosed in Japanese Laid-open Pat. No. 3-217033, the TCP is sucked in vacuum by a mounting head, and is conveyed near the mounting position. Outer leads of a TSP and electrodes of a display panel are taken by a camera in a same viewing field, and the deviation of them is measured. This deviation is then corrected by moving a substrate stage, and the positions arc adjusted. Next, by the backup of a backup mechanism, the lower surface of the display panel is supported, and the mounting head descends so that the outer leads of the TCP are bonded to the display panel. After bonding, the backup mechanism is returned to the home position, and the substrate stage is moved, and bonding of the next TCP is repeated.

In the device used as the driver for display panel, flip chips are also used aside from the TCPs manufactured by the TAB method. A flip chip is manufactured by forming bumps (electrodes) on its circuit surface. Bumps are generally bonded to electrodes on the display panel through an anisotropic conductive film (ACF). In this case, first the ACF is bonded to the electrodes on the display panel, and bumps on the flip chip are accurately positioned on the electrodes formed in the marginal area of the display panel, and bonded.

Or after the ACF is adhered to the bump of the flip chip, the bump of the flip chip is accurately positioned to the electrode formed in the marginal area of the display panel, and is bonded.

Generally, the outer leads of TCP are very thin and their pitch is extremely narrow. To bond outer leads of such narrow pitch on the electrodes on the display panel, the outer leads must be accurately positioned. What is more important, since a multiplicity of TCPs must be bonded on the display panel, the bonding job must be done at high speed. That is, the bonding apparatus for bonding TCPs on the display panel is required to have high precision and high speed.

In the conventional bonding apparatus mentioned above, however, after determining the deviation of the display panel and the TCP, by taking them by a camera, in order to support the display panel by the backup mechanism, the backup mechanism is transferred, and the backup mechanism is thereby caused to contact the display panel to shift the position of the display panel, and as a result, a bonding of high precision is not realized. Besides, every time a device is bonded, the backup mechanism must be operated, and the bonding work is delayed.

Incidentally, the display panel is quadrangular, and TCPs are bonded in the marginal area, but the devices bonded to one side (longer side) and the devices bonded to the other side (shorter side) are different in variety. Therefore, a TCP bonding apparatus is desired to be capable of bonding two different types of TCPs to the display device for the efficiency of the work. It is also preferred that the bonding job be done continuously on plural sides. The same problems occur also when bonding flip chips.

SUMMARY OF THE DISCLOSURE OF THE INVENTION

It is hence a primary object of the invention to present a bonding apparatus and bonding method of devices capable of bonding devices such as TCPs and flip chips on a display panel at high precision and high speed.

It is another object of the invention to present a bonding apparatus and bonding method of devices capable of bonding two types of devices on electrodes of a display panel at high speed and high precision.

To achieve the objects, the invention provides a bonding apparatus for bonding electrodes of devices by the devices on electrodes formed at plural bonding positions in a marginal area of a display panel, comprising:

a first support section for supporting the display panel from beneath.

a second support section for supporting the plural bonding positions in a marginal area of the display panel from beneath, positioning means for positioning the electrodes of devices on the electrodes formed on the upper surface of the end area of the display panel, and bonding means for bonding the positioned electrodes of devices by pressing them on the electrodes of the display panel.

In this constitution, the plural bonding positions of the device formed in the marginal area of the display panel are supported from beneath by the second support section, and by continuously bonding the device on the plural positions in this state, the device can be bonded to the electrodes of the display panel at high precision and at high speed.

Moreover, by using the first support section as the θ-table device, this θ-table is rotated horizontally in 90° unit to change the direction of the display panel, and also by varying the distance between the θ-table device and second support section by distance changing means, bonding of the devices formed in plural marginal areas of the display panel to the bonding positions can be done automatically.

The invention itself, together with further objects and attendant advantages, will best be understood by reference to the following detailed description taken in conjunction with the accompanying drawings.

DESCRIPTION OF THE PREFERRED EMBODIMENTS

Figure 1:
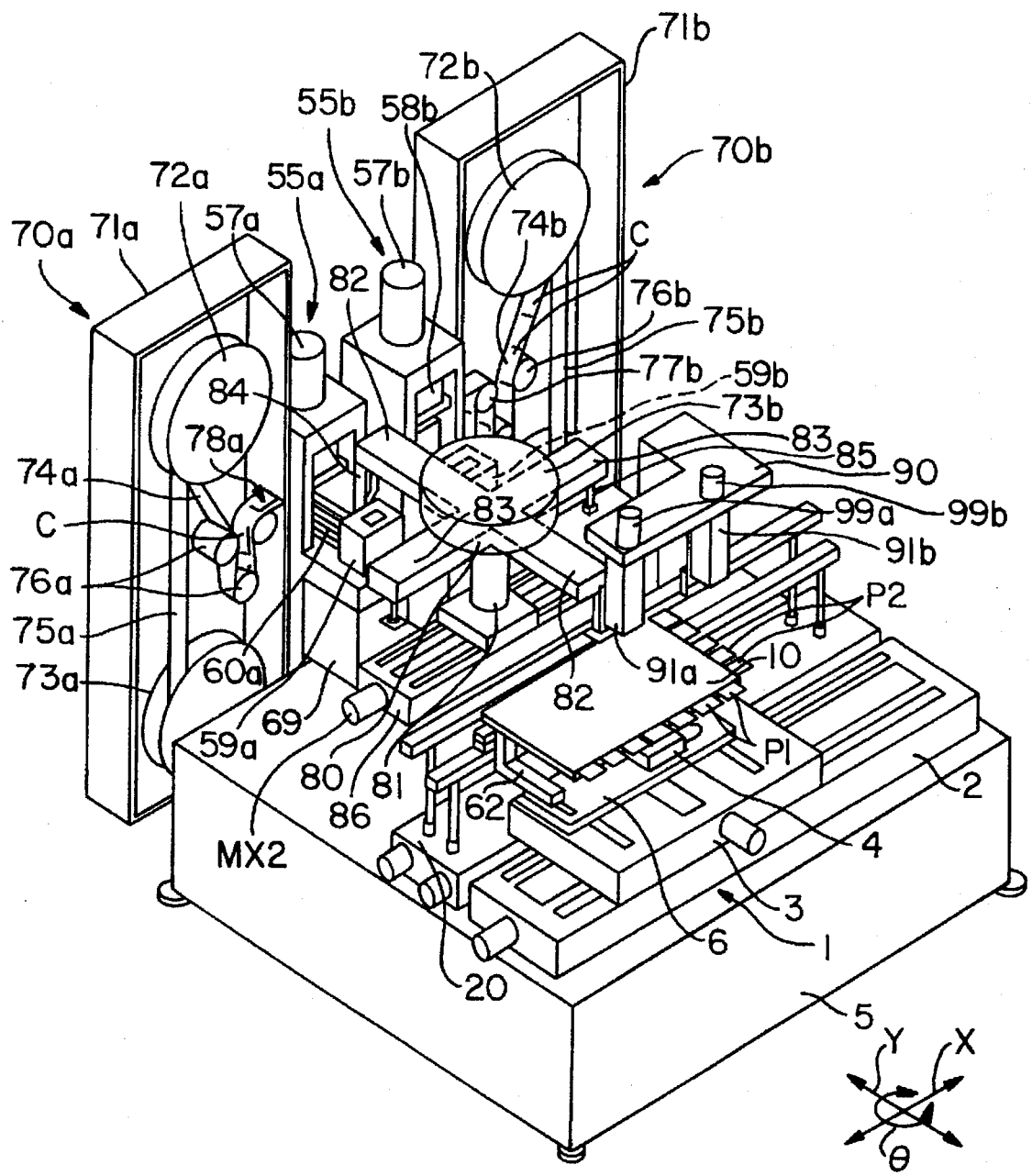
FIG. 1 is a perspective view of a device bonding apparatus in a first embodiment of the invention.
Figure 2:
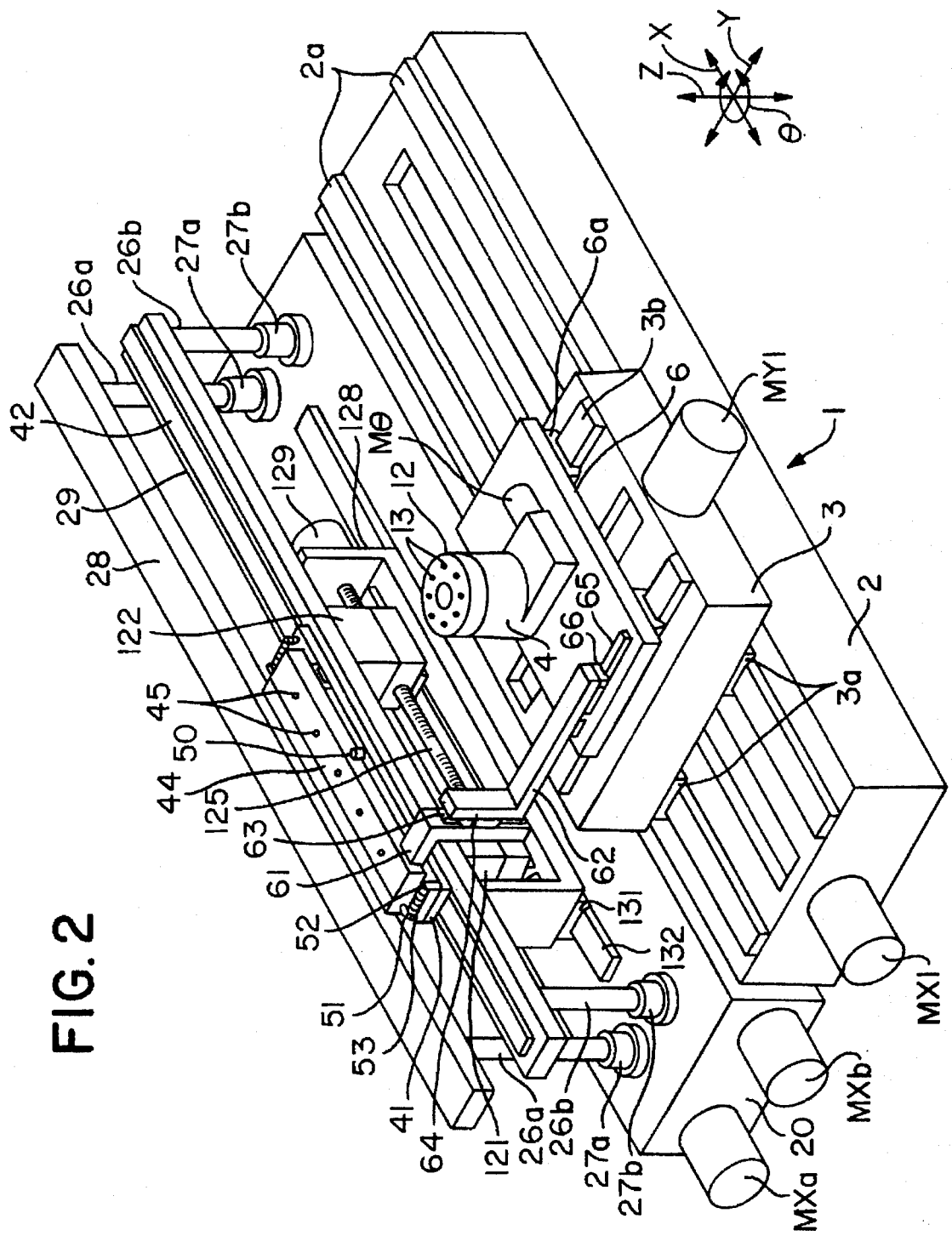
FIG. 2 is a perspective view of a display panel moving mechanism of the device bonding apparatus in the first embodiment of the invention.
Figure 3:
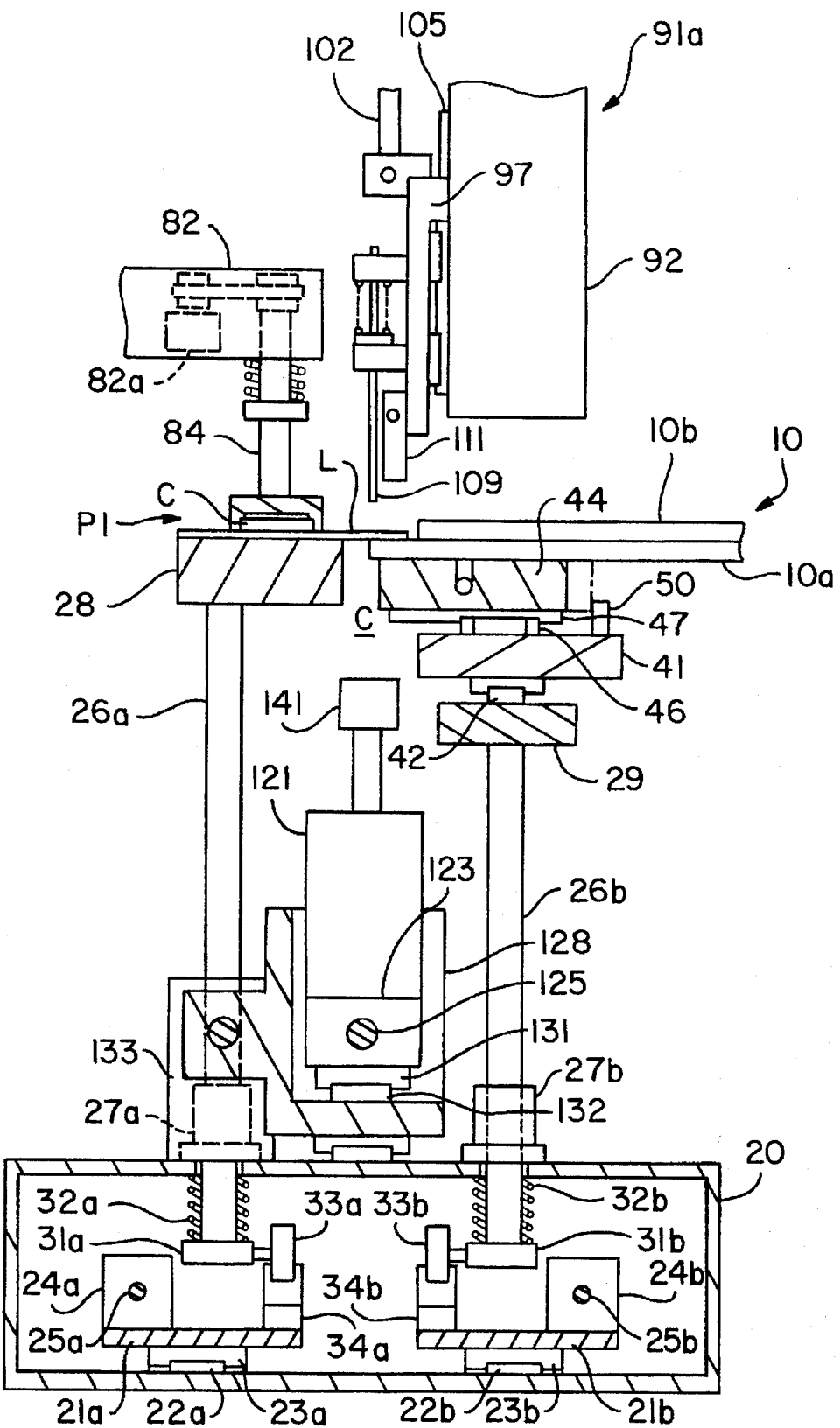
FIG. 3 is a sectional view of a bonding station of the device bonding apparatus in the first embodiment of the invention.
Figure 4:
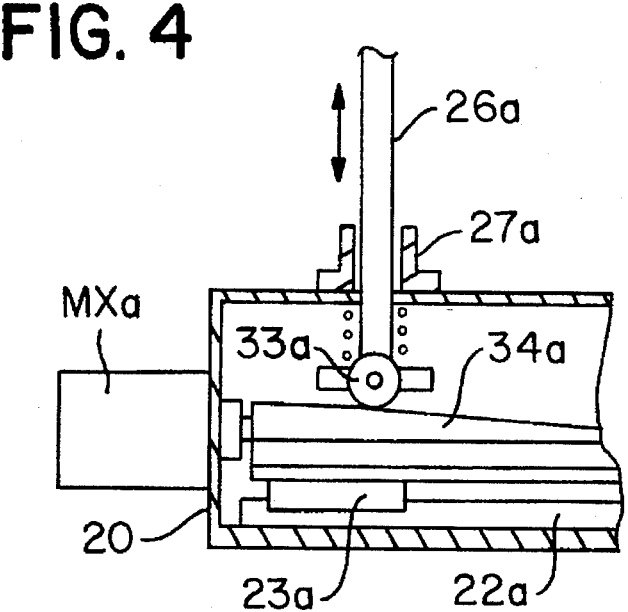
FIG. 4 is a sectional view of a pole elevating mechanism of the device bonding apparatus in the first embodiment of the invention.
Figure 5:
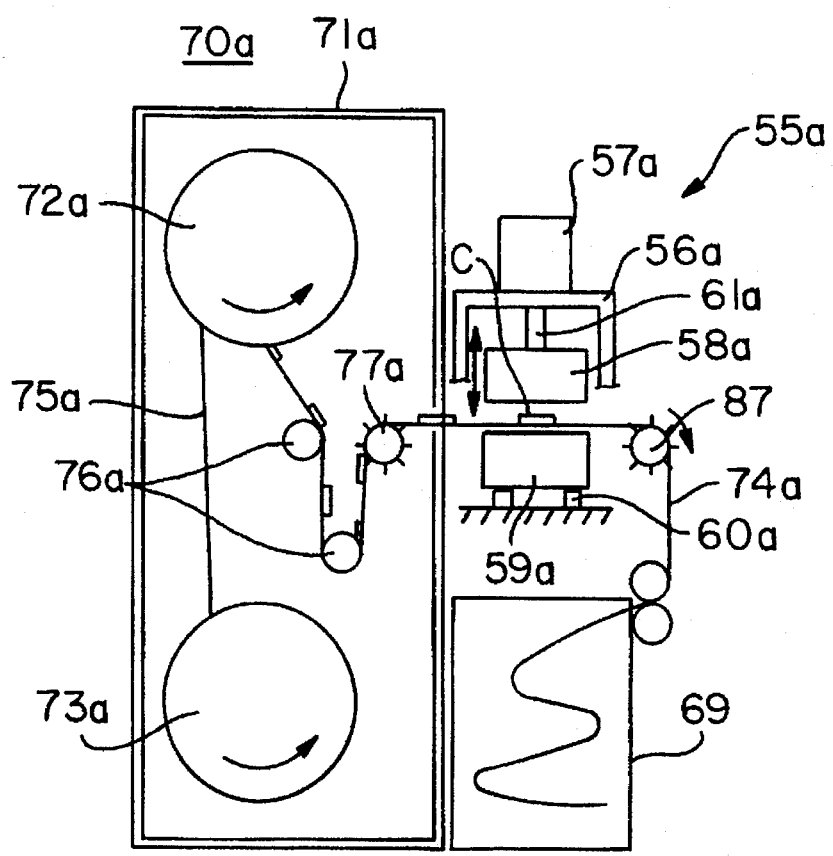
FIG. 5 is a front view of a first feed section of the device bonding apparatus in the first embodiment of the invention.
Figure 6:
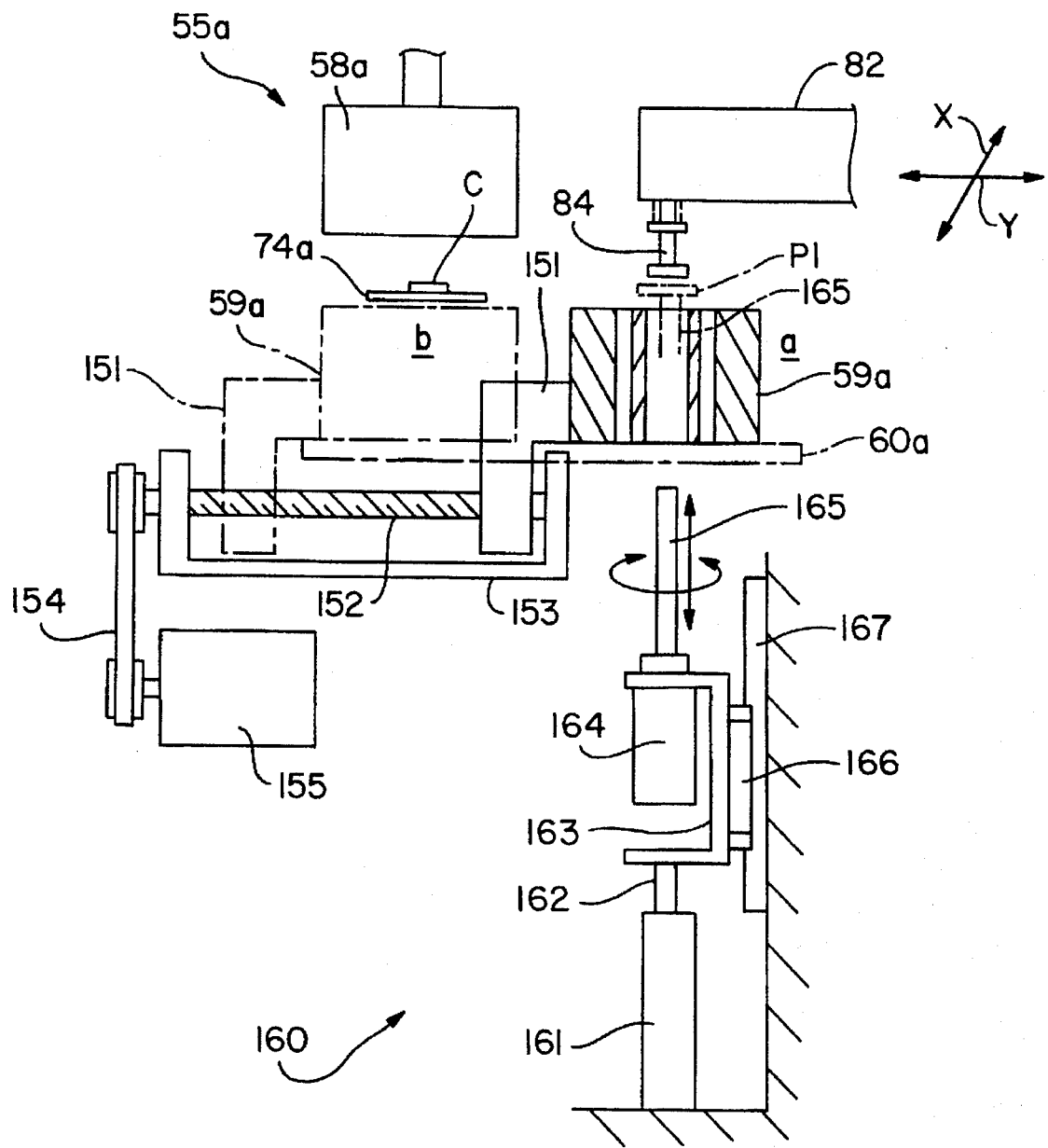
FIG. 6 is a sectional view showing a pickup process of a first device of the device bonding apparatus in the first embodiment of the invention.
Figure 7:
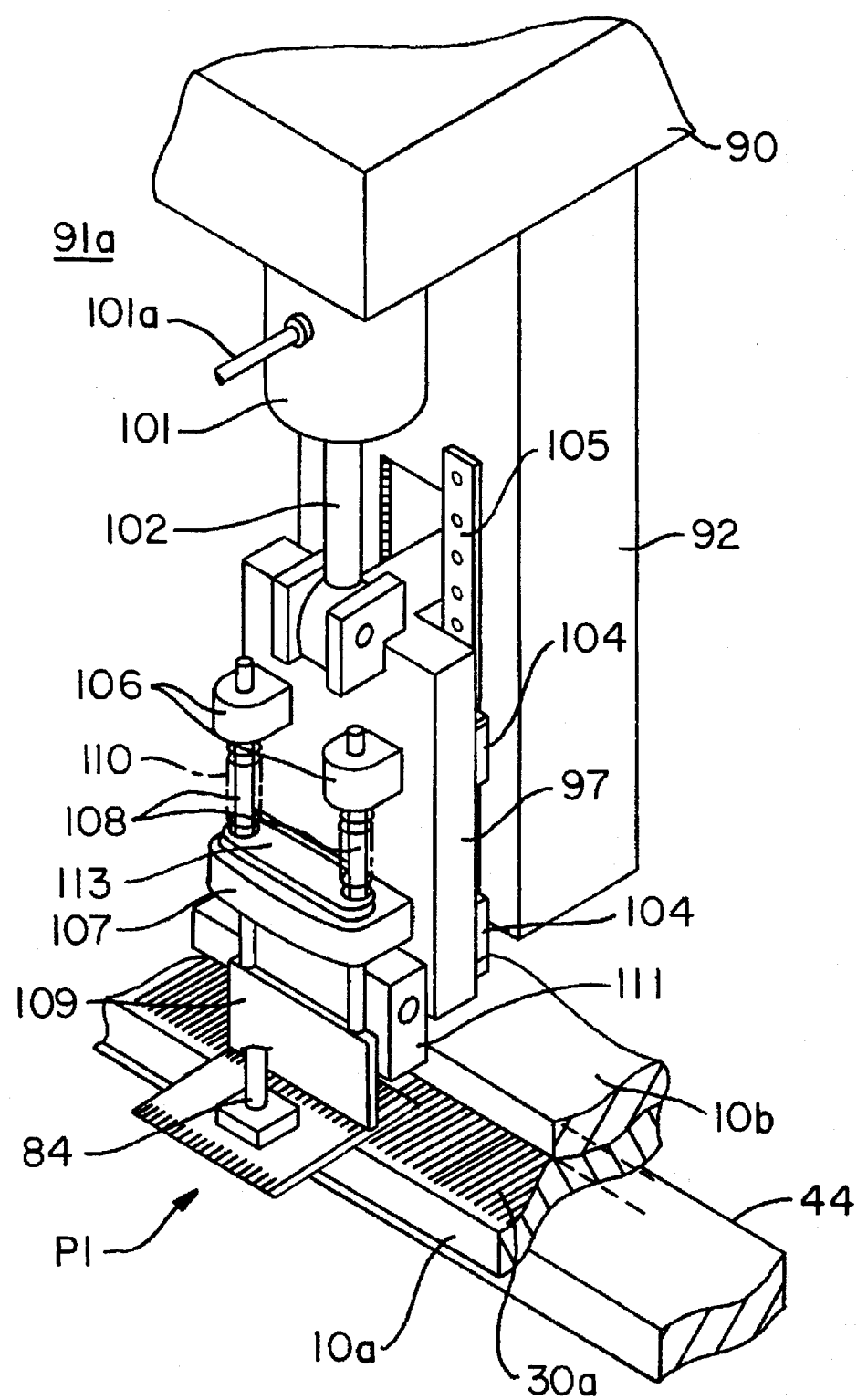
FIG. 7 is a perspective view of a first head of the device bonding apparatus in the first embodiment of the invention.
Figure 8:
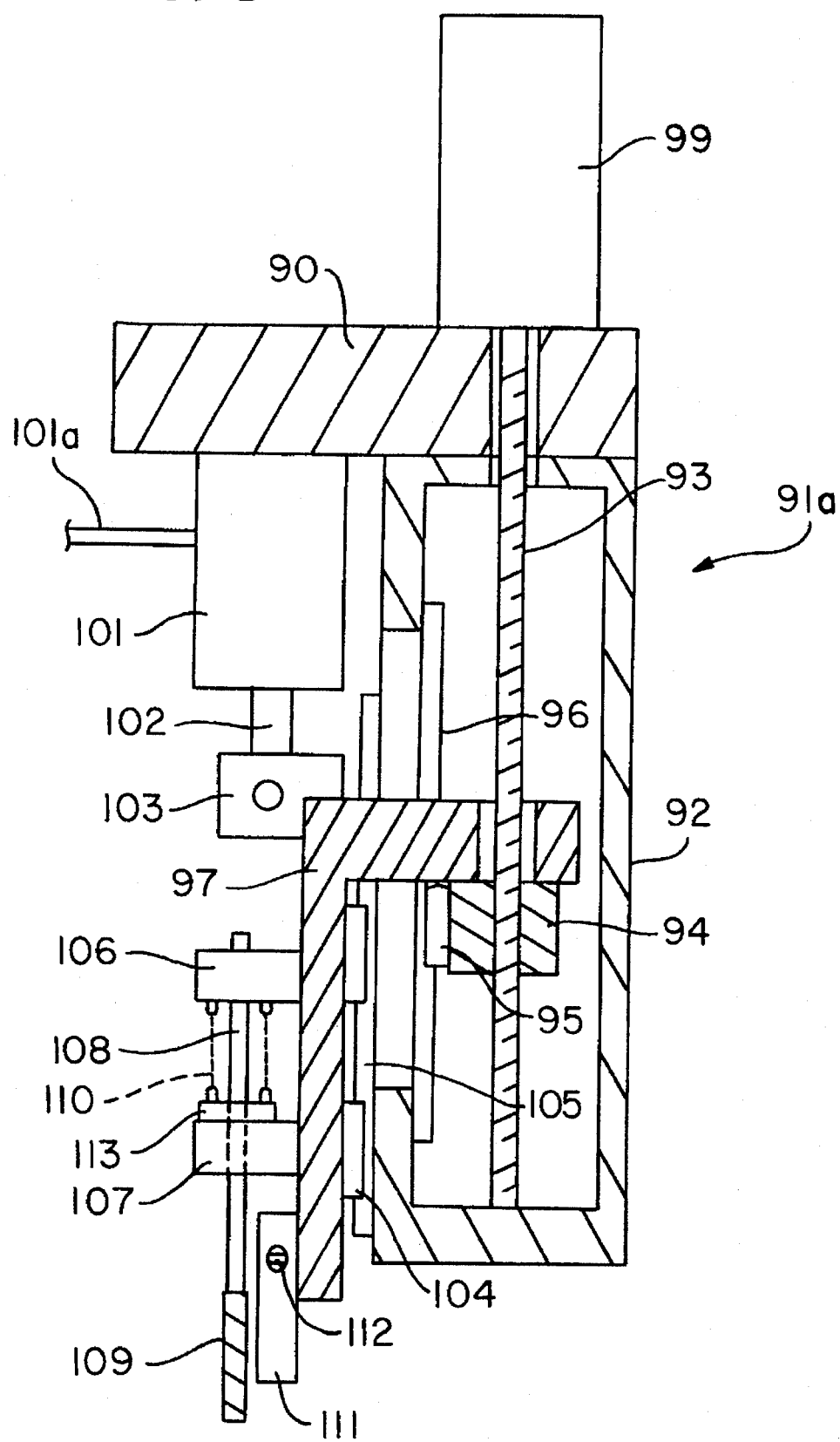
FIG. 8 is a sectional view of the first head of the device bonding apparatus in the first embodiment of the invention.
Figure 9:
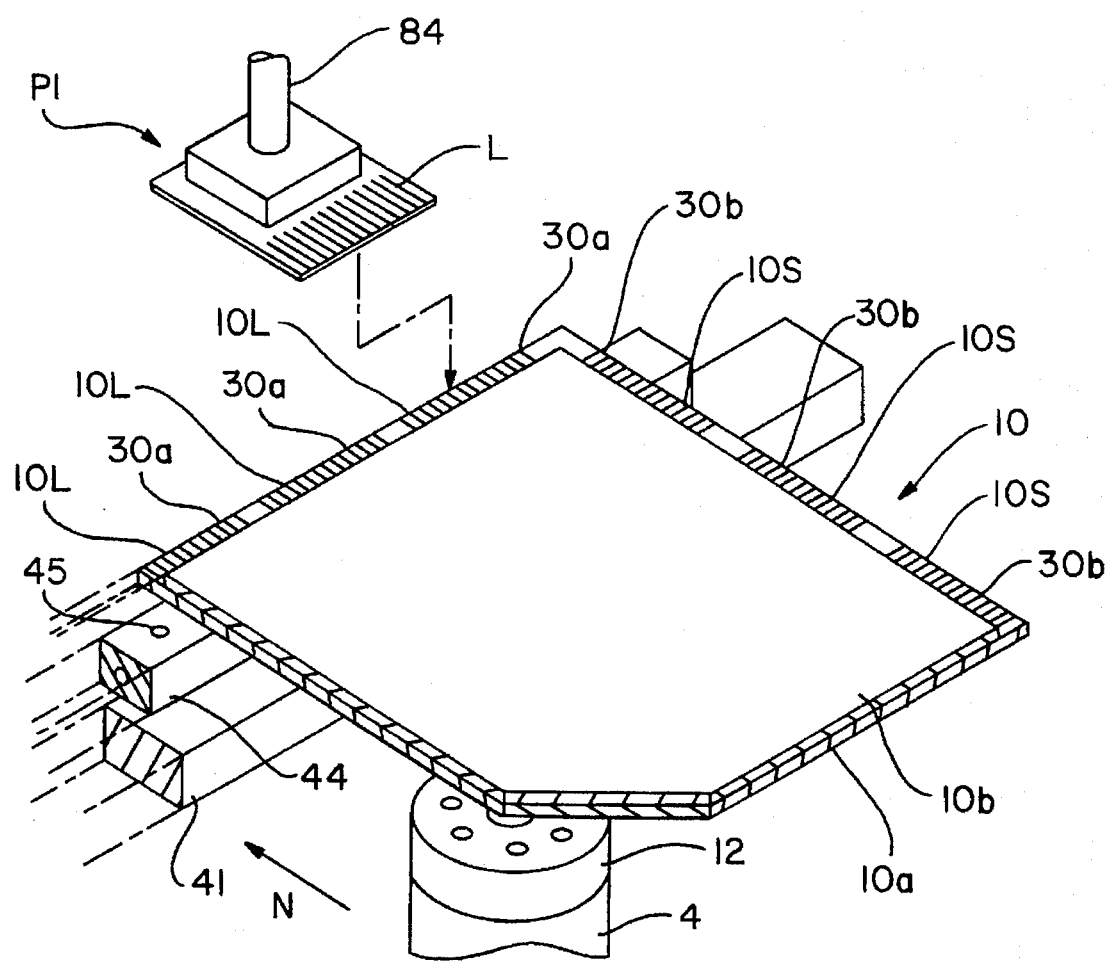
FIG. 9 is a perspective view of essential parts in a bonding process of the device bonding apparatus in the first embodiment of the invention.
Figure 10:
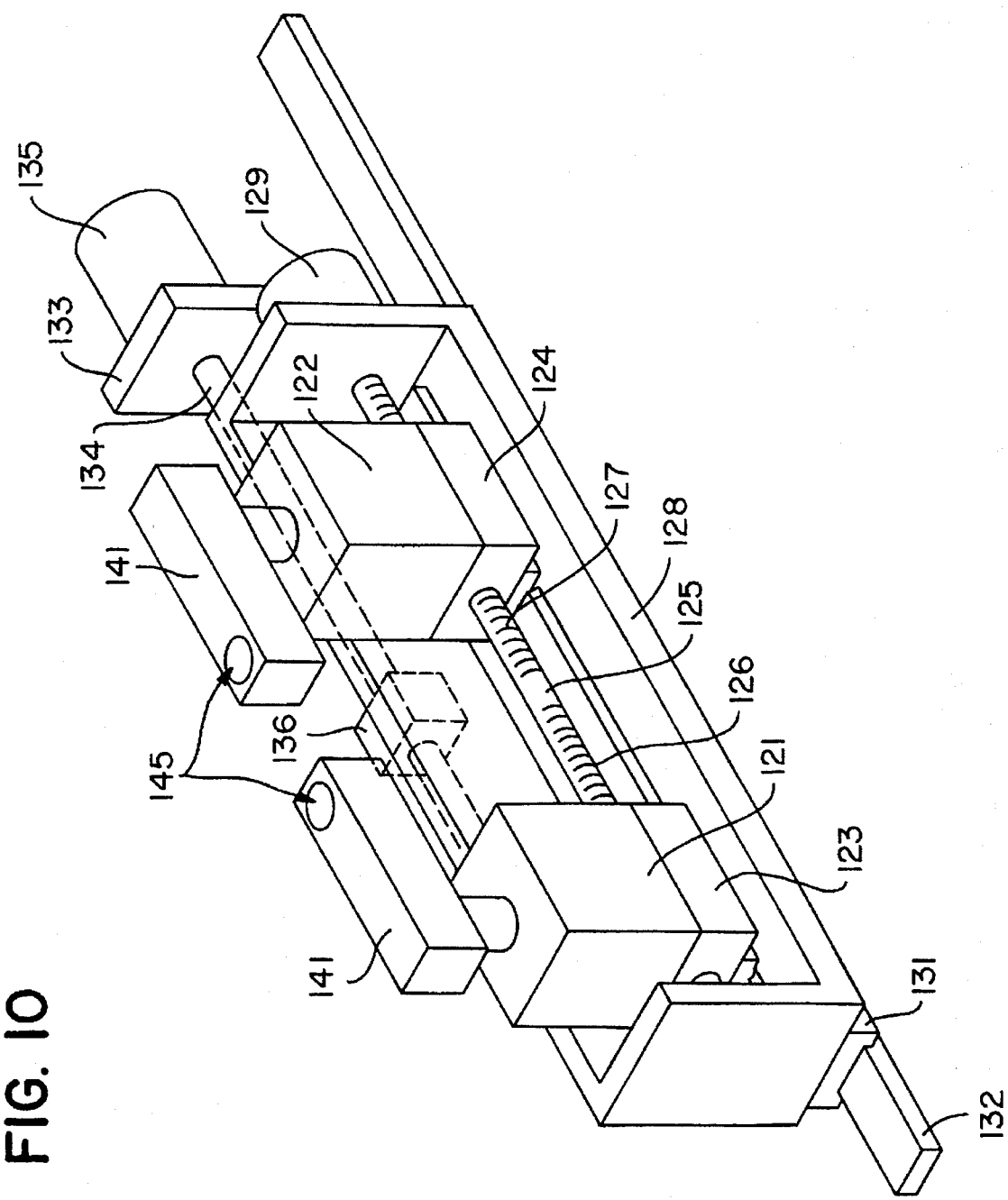
FIG. 10 is a perspective view of an observation device of the device bonding apparatus in the first embodiment of the invention.
Figure 11:
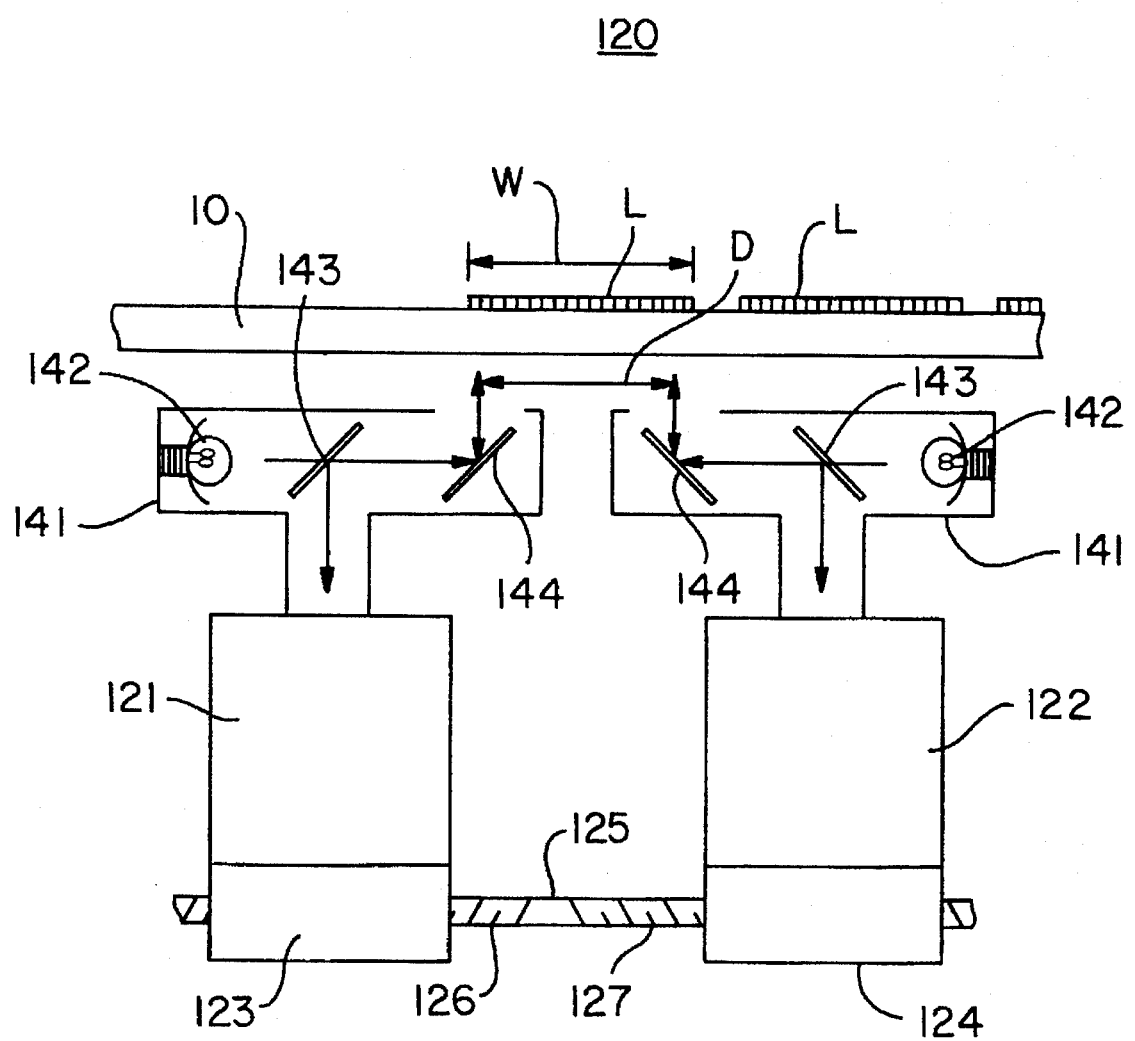
FIG. 11 is a sectional view of the observation device of the device bonding apparatus in the first embodiment of the invention.
Figure 12A:
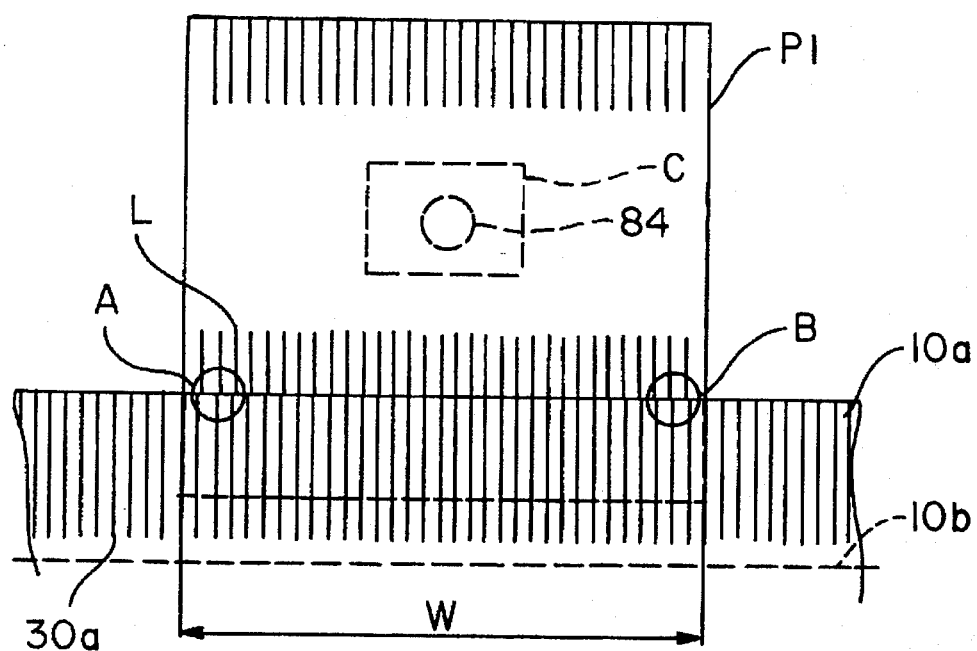
FIG. 12(a) is a plan view of the first device in an observation process of the device bonding apparatus in the first embodiment of the invention.
Figure 12B:
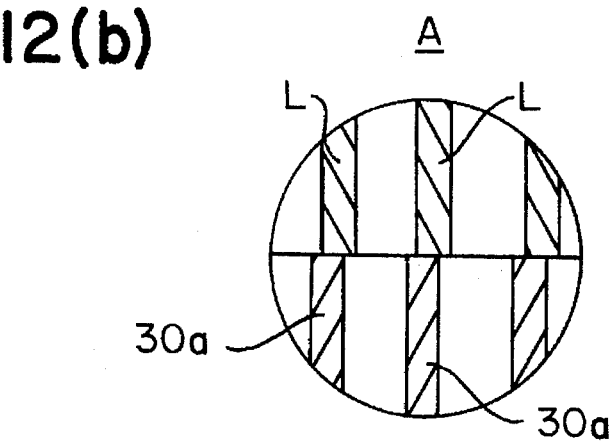
FIG. 12(b) is a viewing field diagram of a first camera of the device bonding apparatus in the first embodiment of the invention.
Figure 12C:
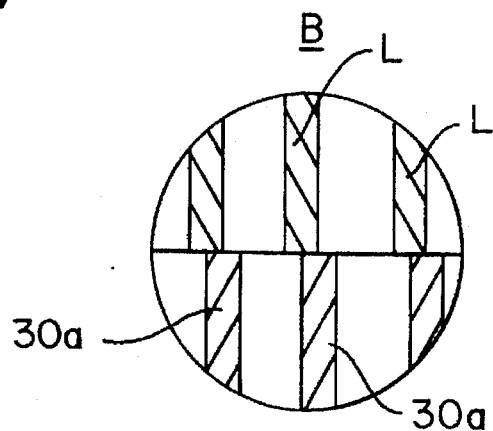
FIG. 12(c) is a viewing field diagram of a second camera of the device bonding apparatus in the first embodiment of the invention.
Figure 13A:
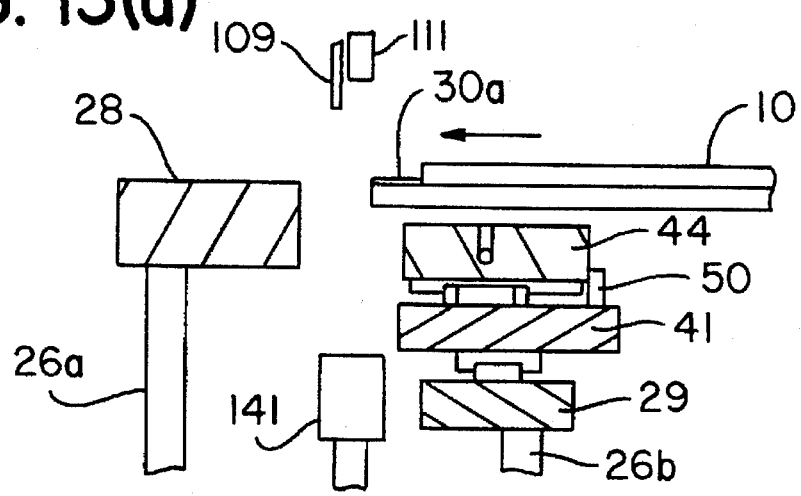
FIG. 13(a), FIG. 13(b), and FIG. 13(c) are positioning mechanism diagrams of a display panel of the device bonding apparatus in the first embodiment of the invention.
Figure 13B:
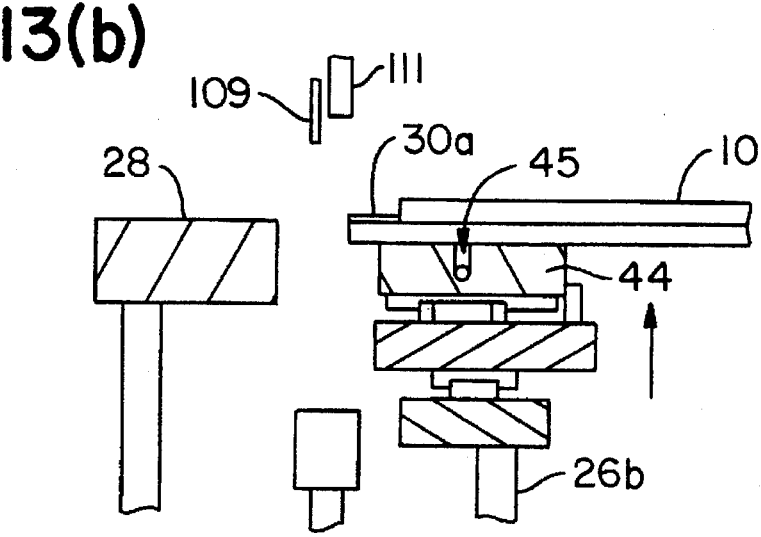
Figure 13C:
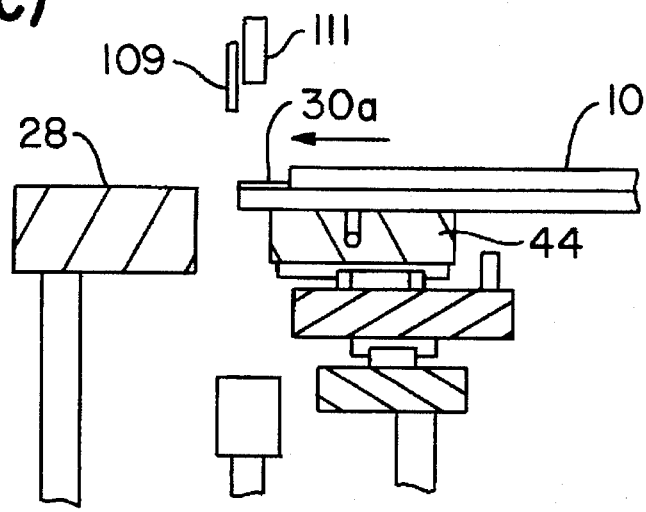
Figure 14:
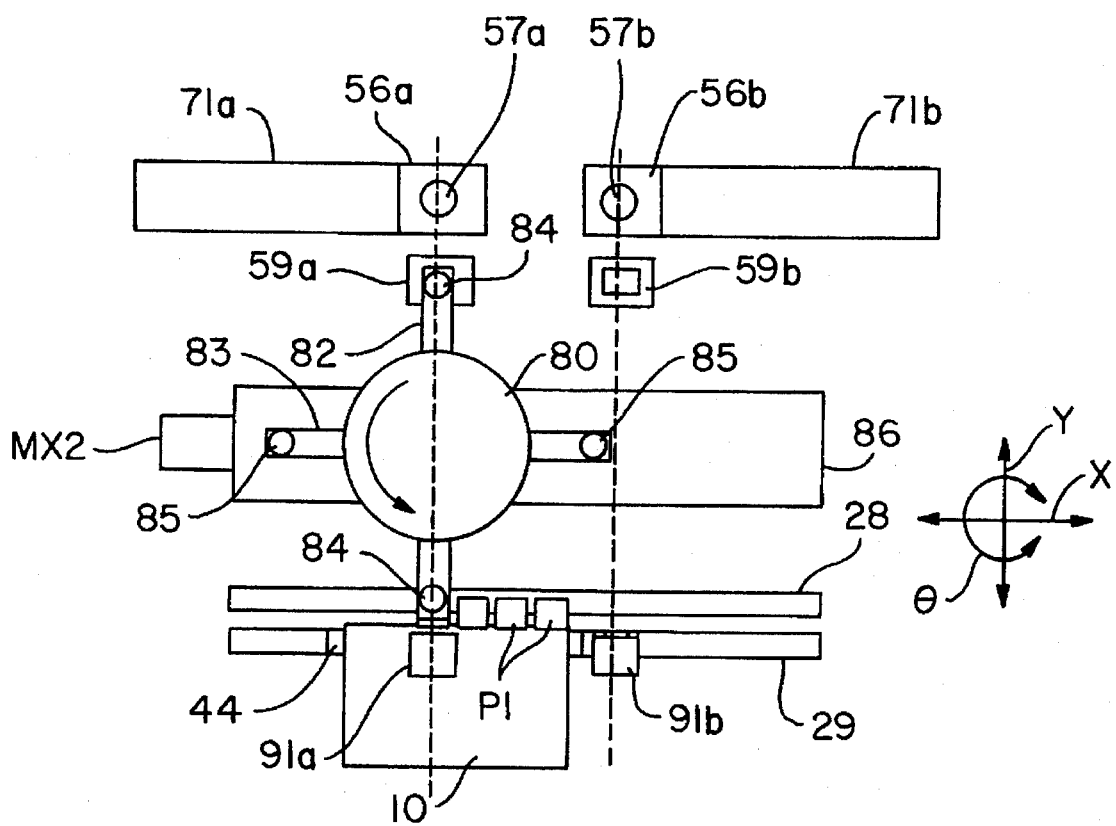
FIG. 14 is a schematic plan view of the device bonding apparatus in the first embodiment of the invention.
Figure 15A:
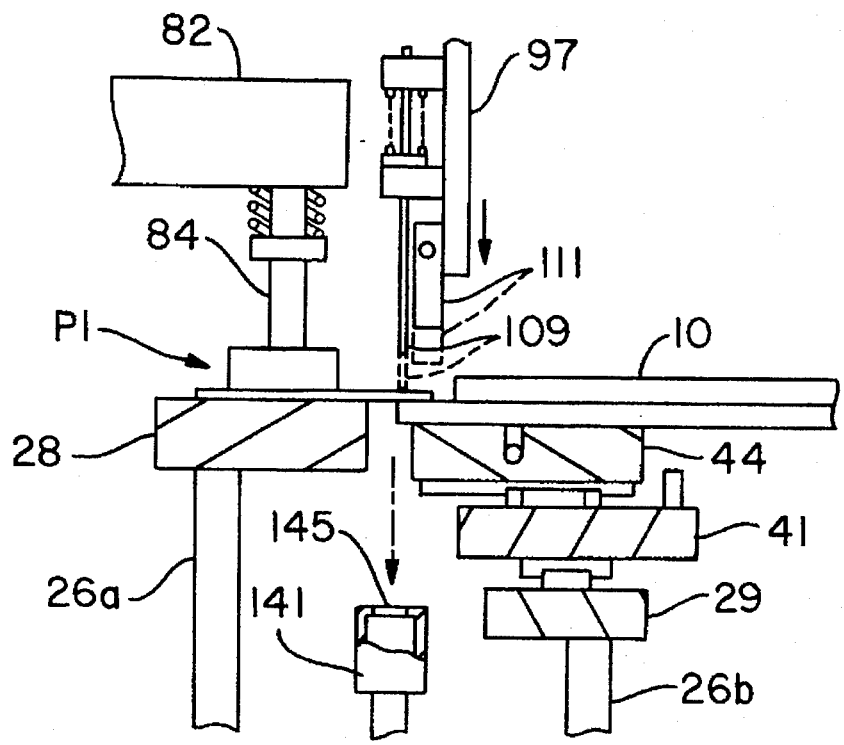
FIG. 15(a) and FIG. 15(b) are sectional views in a process of bonding of the first device on a display panel of the device bonding apparatus in the first embodiment of the invention.
Figure 15B:
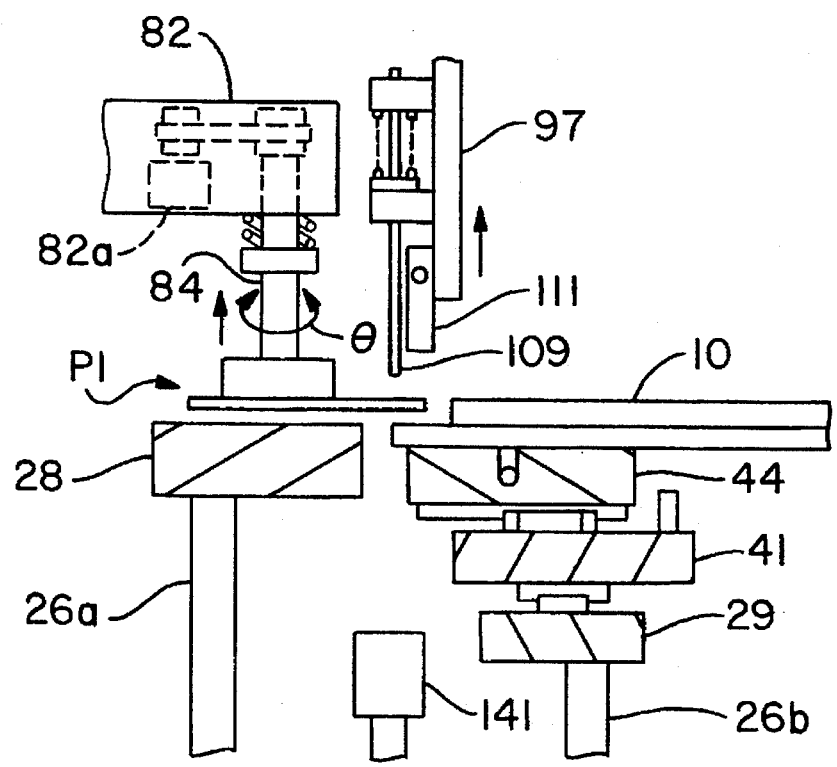
Figure 16A:
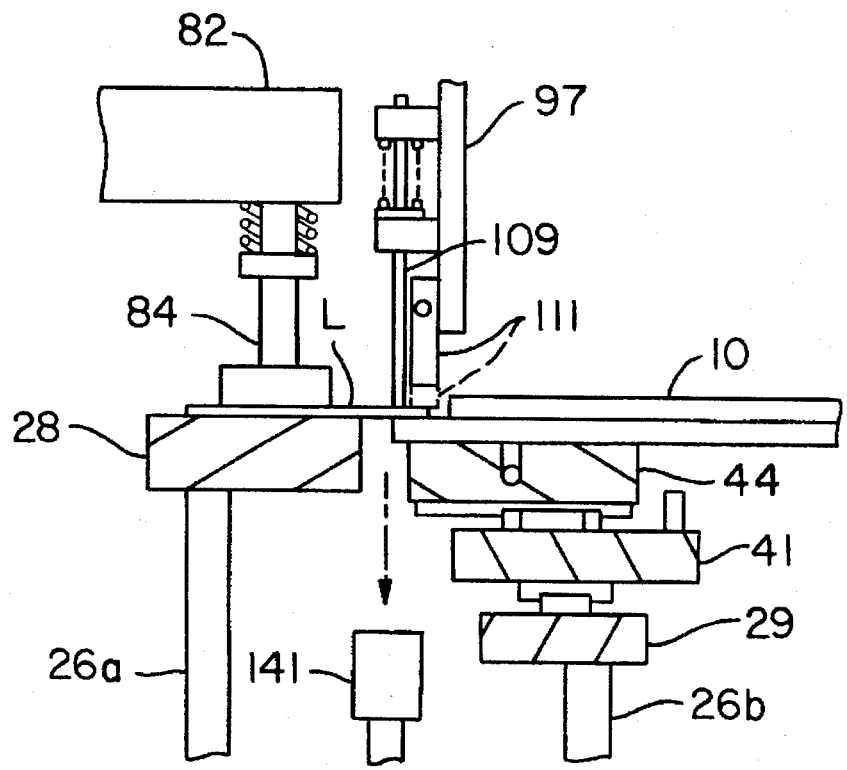
FIG. 16(a) and FIG. 16(b) are sectional views in a process of bonding of the first device on the display panel of the device bonding apparatus in the first embodiment of the invention.
Figure 16B:
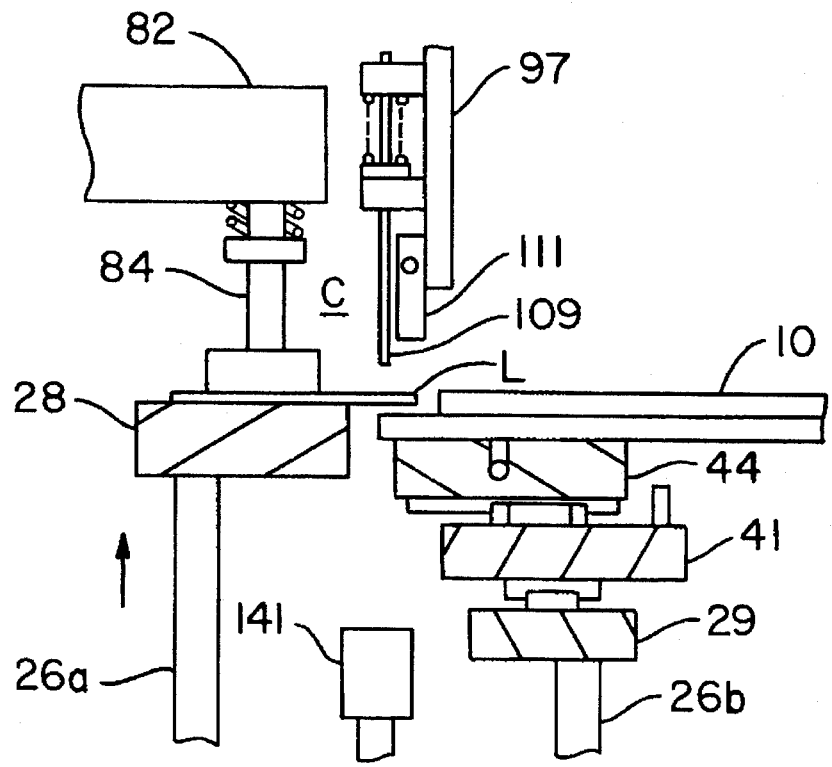
Figure 17:
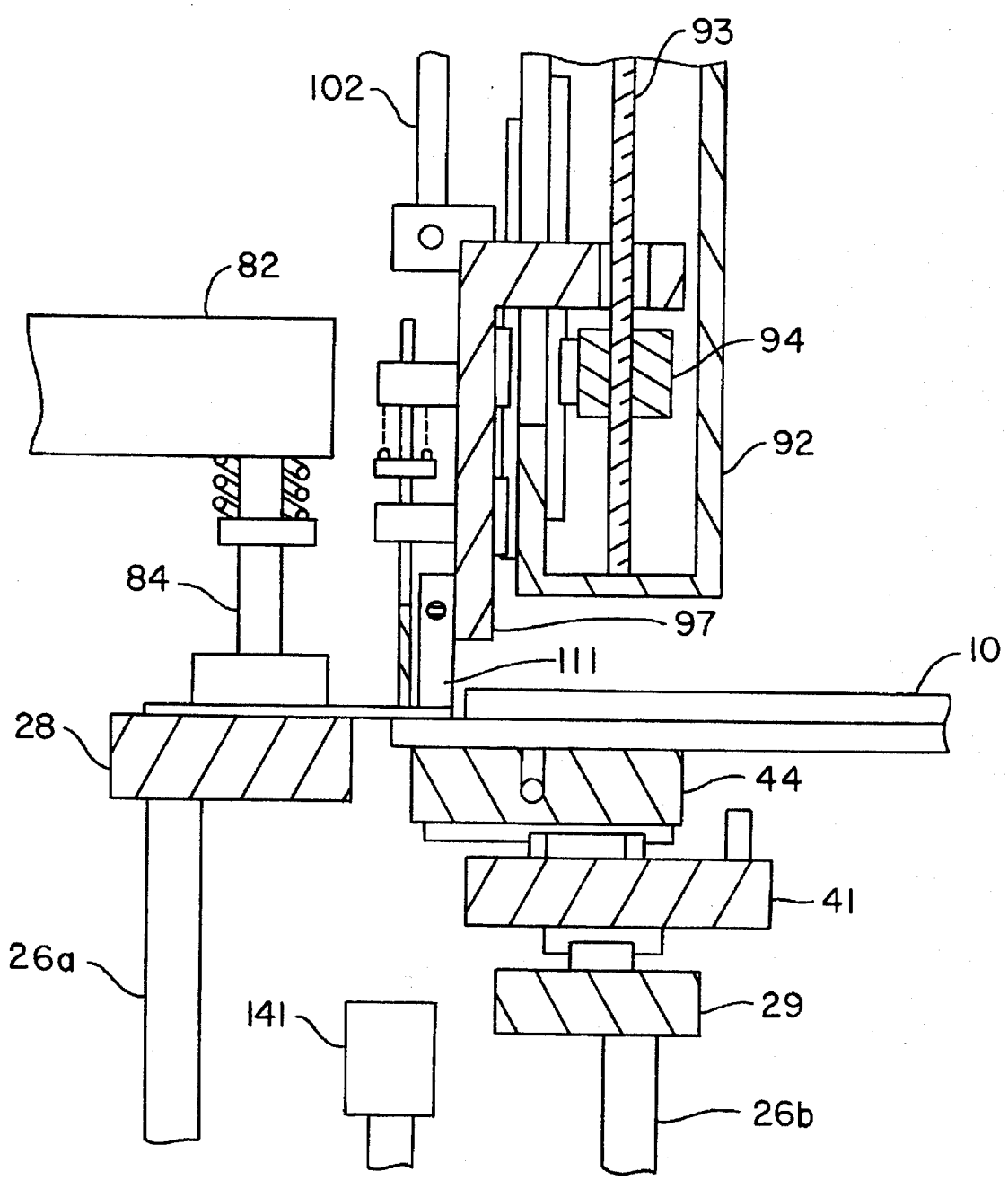
FIG. 17 is a sectional view in a process of bonding of the first device on the display panel of the device bonding apparatus in the first embodiment of the invention.
Figure 18:
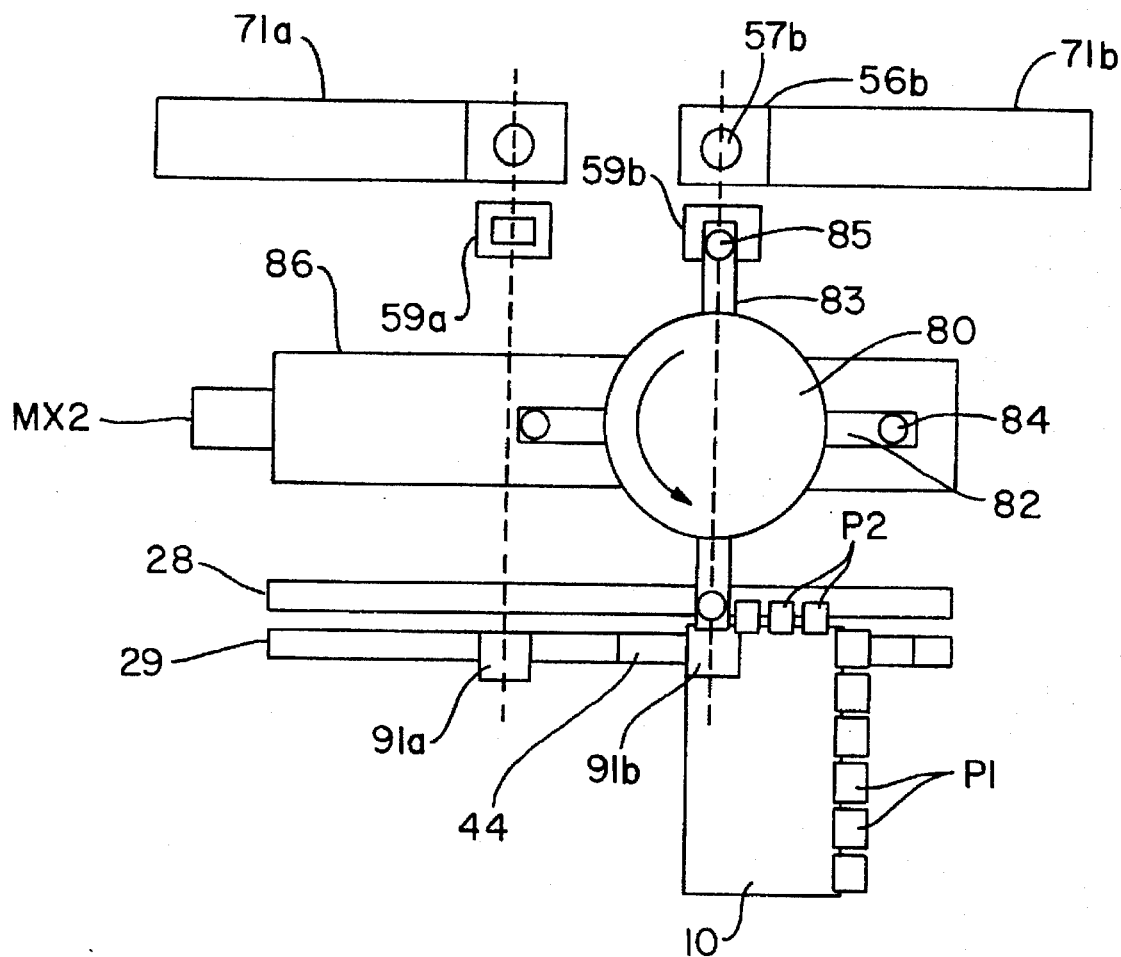
FIG. 18 is a schematic plan view of the device bonding apparatus in the first embodiment of the invention.
Figure 19A:
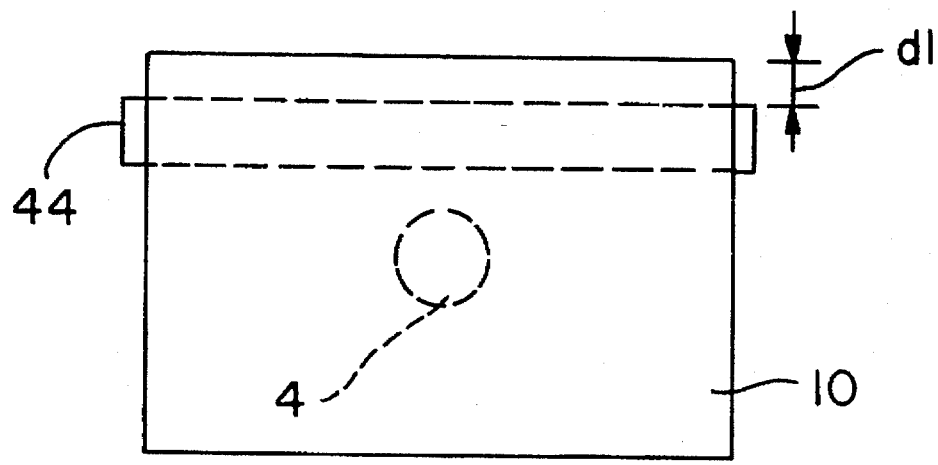
FIG. 19(a) and FIG. 19(b) are plan views of a third long plate of the display panel of the device bonding apparatus in the first embodiment of the invention.
Figure 19B:
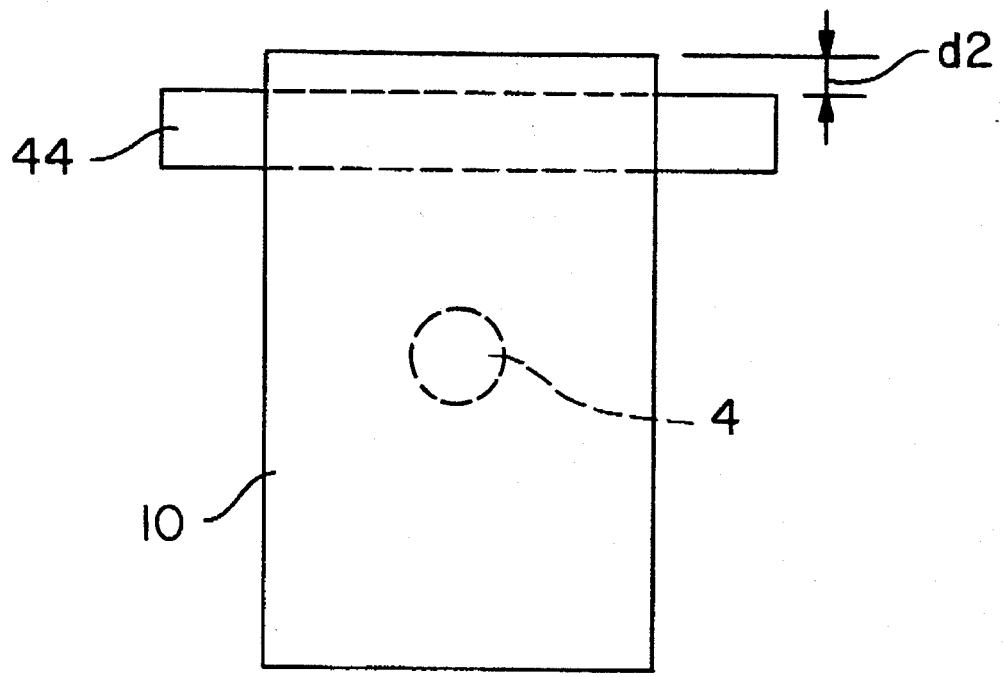

Referring now to the drawings, the preferred embodiments of the invention are described below. FIGS. 1-20 are used to describe the first embodiment. FIG. 1 is a general perspective view of a device bonding apparatus in a first embodiment of the invention. FIG. 2 is a perspective view of a moving mechanism of display panel of the device bonding apparatus, FIG. 3 is a sectional view of a bonding station of the device bonding apparatus, FIG. 4 is a sectional view of a pole elevating mechanism of the device bonding apparatus, FIG. 5 is a front view of a first feed section of the device bonding apparatus, FIG. 6 is a sectional view showing a pickup process of a first device of the device bonding apparatus, FIG. 7 is a perspective view of a first head of the device bonding apparatus, FIG. 8 is a sectional view of the first head of the device bonding apparatus, FIG. 9 is a perspective view of essential parts in a bonding process of the device bonding apparatus, FIG. 10 is a perspective view of an observation device of the device bonding apparatus in the first embodiment of the invention, FIG. 11 is a sectional view of the observation device of the device bonding apparatus, FIG. 12(a) is a plan view of the first device in an observation process of the device bonding apparatus, FIG. 12(b) is a viewing field diagram of a first camera of he device bonding apparatus, FIG. 12(c) is a viewing field diagram of a second camera of the device bonding apparatus, FIG. 13(a), FIG. 13(b), and FIG. 13(c) are positioning mechanism diagrams of a display panel of the device bonding apparatus, FIG. 14 is a schematic plan view of the device bonding apparatus, FIG. 15(a) and FIG. 15(b) are sectional views in a process of bonding of the first device on a display panel of the device bonding apparatus, FIG. 16(a) and FIG. 16(b) are sectional views in a process of bonding of the first device on the display panel of the device bonding apparatus, FIG. 17 is a sectional view in a process of bonding of the first device on the display panel of the device bonding apparatus, FIG. 18 is a schematic plan view of the device bonding apparatus, and FIG. 19(a) and FIG. 19(b) are plan views of the display panel and a third long plate of the device bonding apparatus.

In FIG. 1, in the upper front area of a base 5, there lies moving means 1 for moving a display panel 10 in X-direction, Y-direction, and θ-direction. This moving means 1 has a Y-table device 3 mounted on an X-table device 2, and a θ-table device 4 (see FIG. 2) having a suction section 12 in the upper part is mounted on the Y-table device 3 (hereinafter called X-table 2, Y-table 3, θ-table 4). The θ-table 4 is a first support section for supporting the middle of the display panel 10 from beneath. The X-table 2 and Y-table 3 are disposed orthogonally to each other. The X-table 2 has a motor MXI, and the Y-table 3 has a motor MY1. In FIG. 1 and FIG. 2, an X-direction guide rail 2a is provided on the upper surface of the X-table 2. A slider 3ato, be fitted with the guide rail 2a, is provided on the lower surface of the Y-table 3. When the motor MXI is driven, the Y-table 3 moves horizontally in the X-direction along the guide rail 2a.

In FIG. 2, a bed plate 6 is provided on the Y-table 3. A Y-direction guide rail 3b is provided on the upper surface of the Y-table 3. On the lower surface of the bed plate 6 is provided a slider 6a, which is fitted with the guide rail 3b. When the motor MYI is driven, the bed plate 6 moves horizontally in the Y-direction along the guide rail 3b. When the motor MXI is driven, the bed plate 6 moves in the X-direction together with the Y-table 3. That is, the X-table 2 and the Y-table 3 move the bed plate 6 horizontally in the X-direction or Y-direction.

In FIG. 2, the θ-table 4 is provided on the bed plate 6. The θ-table 4 comprises a suction section 12 for fixing or disposing the display panel 10 on the suction section 12 by sucking vacuum through suction holes 13, and a motor Mθ for rotating the suction section 12 horizontally. The suction holes 13 are connected to a vacuum device (not shown). As shown in FIG. 9, the display panel 10 is disposed on the suction section 12 of the θ-table 4. Therefore, when the motors MXI, MY1 are driven, the display panel 10 moves horizontally in the X-direction or Y-direction, and when the motor Mθ is driven, the display panel 10 rotates horizontally in the θ-direction. As mentioned later, by rotating the display panel 10 horizontally by 90° on the θ-table 4, devices are bonded to the electrodes formed on the orthogonal longer side and shorter side of the display panel 10.

As shown in FIG. 1 and FIG. 2, a box 20 is provided parallel to the X-table 2. FIG. 3 shows a bonding station c of the device. In FIG. 8, two plates 21a, 21b are provide inside the box 20; one plate 21a provided at left side of the box 20 and the other plate 21b provided at the right side of the box 20. The lower surface of each of the plates 21a, 21b are provided with X-direction guide rails 22a, 22b and with sliders 23a, 23b fitted with the guide rails 22a, 22b. At the outer ends of the plates 21a, 21b, nuts 24a, 24b are affixed. Ball screws 25a, 25b in the X-direction are fitted with the nuts 24a, 24b. The ball screws 25a, 25b are driven and rotated by motors MXa, MXb (FIGS. 1, 2) provided at the side of the box 20. When the motors MXa, MXb are driven and the ball screws 25a, 25b are rotated, the plates 21a, 21b move in the X-direction along the guide rails 22a, 22b.

In FIG. 2 and FIG. 3, guide rings 27a, 27b are provided on the upper surface at opposite ends of the box 20, and poles 26a, 26b are elevatably inserted in the guide rings 27a, 27b. Above one pole 26a, a first long plate 28 in the X-direction is provided. As mentioned later, this first long plate 28 works as a support member for supporting the vacuum sucked devices P1, P2 from beneath.

In FIG. 3, a second long plate 29 is provided above the other pole 26b. Beneath the poles 26a, 26b, blocks 31a, 31b are affixed, and coil springs 32a, 32b are fitted above the blocks 31a, 31b. By the spring force of the coil springs 32a, 32b, the poles 26a, 26b are elastically proved downward. At the side of the blocks 31a, 31b, rollers 33a, 33b are rotatably fitted. At the inner ends of the plates 21a, 21b, plate cams 34a, 34b are disposed in the X-direction (FIG. 4), and the rollers 33a, 33b roll on the inclined upper surface of the plate cams 34a, 34b. Therefore, when the motors MXa, MXb are driven to rotate the ball screws 25a, 25b, the plate cams 34a, 34b move in the X-direction. As a result, the rollers 33a, 33b roll on the inclined upper surface of the plate cams 34a, 34b, and the poles 26a, 26b, the first long plate 28 and the second long plate 29 move up and down.

In FIG. 2 and FIG. 3, above the second long plate 29, a slide plate 41 is provided. On the upper surface of the second long plate 29, the X-direction guide rail 42 is provided. A slider 43 provided on the lower surface of the slide plate 41 is fitted to the guide rail 42. Above the slide plate 41, a third long plate 44 is provided. In the third long plate 44, a suction hole 45 is formed for sucking in vacuum under the marginal area of the display panel 10. The suction hole 45 is connected to a vacuum device (not shown). As mentioned later, the third long plate 44 is a support member for supporting the marginal area of the display panel 10 from beneath, when bonding the device to the display panel 10.

As shown in FIG. 3, a slider 46 is provided on the upper surface of the slide plate 41. On the lower surface of the third long plate 44, a guide rail 47 is provided in the Y-direction, to be fitted with this slider 46. In FIG. 2, a pin 51 is planted on the side surface of the long plate 44, and also a pin 52 is planted on the end of the slide plate 41. The pin 51 and pin 52 are coupled with a coil spring 53. A stopper 50 is set up on the upper surface of the slide plate 41. By the spring force of the coil spring 53, the third long plate 44 is thrust to the right in FIG. 3, and is stopped by hitting against the stopper 50 (see chain line in FIG. 3). Thus, the third long plate 44 is provided so as to be free to move in the horizontal direction on the second long plate 29.

In FIG. 2, a key-shaped first bracket 61 is coupled to the side surface of the third long plate 44. A key-shaped second bracket 62 is provided above the bed plate 6. A slider 64, provided on the outer surface of the second bracket 62, is fitted pith a guide rail 63 in the Z-direction provided on the front surface of the first bracket 61. A slider 66, provided on the lower surface of the second bracket 62, is fitted with a guide rail 65 in the Y-direction provided on the upper surface of the bed plate 6.

Thus, in FIG. 2, when the motor MX1 is driven, the Y-table 3 and bed plate 6 move in the X-direction along the guide rail 2a, and at this time, the third long plate 44 and slide plate 41 coupled to the bed plate 6 through the first bracket 61 and second bracket 62, move in the X-direction along the guide rail 42. When the motor MYI of the Y-tale 3 is driven, the bed plate 6 moves in the Y-direction along the guide rail 3b, but at this time, since the slider 66 slides on the guide rail 65, the third long plate 44 remains stopped. When the motor MXb is driven, the pole 26b ascends or descends, as explained by reference to FIG. 3, and the third long plate 44 ascends or descends together with the pole 26b. At this time, the guide rail 63 (FIG. 2) also ascends or descends along the slider 64.

As mentioned above, when the motor MXb shown in FIG. 2 is driven, the ball screw 25b rotates in FIG. 3, and the plate 21b moves in the X-direction. As a result, the roller 33b rolls on the inclined upper surface of the plate cam 34b, and the pole 26b and the third long plate 44, supported by this pole 26b, ascend and descend. FIG. 3 shows the state of supporting the longer side of the display panel 10 from beneath by the third long plate 44, as the pole 26b and the third long plate 44 ascend, and as shown in FIG. 9. In this state, outer leads L or electrodes of the device P1 are bonded to electrodes 30a formed at the bonding position 10L of the longer side of the display panel 10. When bonding is over, the motor MXb moves in reverse direction, the plate 21b moves in reverse direction, and the pole 26b and third long plate 44 descend, thereby canceling the longer side support state of the display panel 10. Specifically, the pole 26b, roller 33b, plate cam 34b, plate 21b, nut 24b, ball screw 25b, and motor MXb are used as raising and lowering means for raising and lowering the third long plate 44.

In FIG. 9, the display panel 10 is composed by laminating an upper plate 10b on a lower plate 10a, forming multiple electrodes 30a at plural bonding positions 10L on a longer side of the lower plate 10a, are forming multiple electrodes 30b at plural bonding positions 10S on a shorter side. At the bonding positions 10L, first devices P1 are bonded one by one, and at the bonding positions 10S, second devices P2 (not shown) are bonded one by one. Although not shown, meanwhile, anisotropic conductive films (ACFs) are preliminarily adhered at the bonding positions 10L, 10S. As shown in FIG. 3 and FIG. 8, the first device P1 and second device P2 have chips C being cut out of the wafer, and outer leads L extending forward from the chips C. As mentioned later, the first device P1 is picked up by a first nozzle 84, and its outer lead L is bonded to the electrode 30a on the longer side of the display panel 10. The second device P2 is picked up by a second nozzle 85, and its outer lead L is bonded to the electrode 30b on the shorter side of the display panel 10.

In FIG. 1, behind the base 5, there are a first feed section 70a for feeding a first film carrier 74a into a first cutting device 55a, and a second feed section 70b for feeding a second film carrier 74b into a second cutting device 55b. The first feed section 70a has a first case 71a. Inside the first case 71a are provided a first feed reel 72a and a first take-up reel 73a. On the first feed reel 72a, the first film carrier 74a and a first interlayer tape 75a are wound. The first take-up reel 73a takes up the first interlayer tape 75a. Further inside the first case 71a are provided a first guide roller 76a and a first sprocket 77a for guiding the running of the first film carrier 74a. Chips C are bonded to this first film carrier 74a at pitches. The first film carrier 74a is supplied into the first cutting device 55a through an opening 78a of the first case 71a. A first tab device P1 obtained by blanking this first film carrier 74a by means of the first cutting device 55a is bonded to the electrode 30a formed on the longer side of the display panel 10.

The second feed section 70b is composed same as the first feed section 70a, and comprises a second case 71b, and in the inside thereof are provided a second feed reel 72b, a second take-up reel 73b, a second film carrier 74b, a second interlayer tape 75b, a second guide roller 76b, and a second sprocket 77b. Chips C are bonded to the second film carrier 74b at pitches. The second tab device P2 obtained by blanking the second film carrier 74b by the second cutting device 55b is bonded to the electrode 30b formed on the shorter side of the display panel 10.

In FIG. 1, at the side of the first case 71a, the first cutting device 55a is provided. On a first frame 56a, which is a principal member of the first cutting device 55a, is provided a first cylinder 57a. Inside the frame 56a is provided a first upper pattern 58a of a die. Beneath the first frame 56a is provided a guide rail 60a in the Y-direction. A first lower pattern 59a of a die is provided on the guide rail 60a.

In FIG. 1 and FIG. 5, by means of a driven motor (not shown) provided behind the first case 71a, when the first feed reel 72a, first take-up reel 73a and sprocket 87 are put in rotation, the first film carrier 74a and interlayer tape 75a are wound on the first feed reel 72a and are paid out from the first feed reel 72a, and the first film carrier 74a turns around the guide roller 76a and first sprocket 77a, and is guided beneath a first upper pattern 58a. At this time, the first lower pattern 59a slides on the first guide roll 60a and is positioned immediately beneath the first upper pattern 58a. When a rod 61a of the first cylinder 57a projects downward, the first upper pattern 58a descends, and the first film carrier 74a is blanked by the first upper pattern 58a and first lower pattern 59a, and the first device P1 is obtained. Next, the rod 61a of the first cylinder 57a ascends to raise the first upper pattern 58a, and the first device P1, blanked out of the first film carrier 74a, is mounted on the first lower pattern 59a. Reference numeral 69 denotes a recovery box of the film carrier 74a from which the device P1 is blanked, and is installed beneath the first upper pattern 58a.

FIG. 6 shows the moving means of the lower pattern 59a. The first device P1 blanked out of the film carrier 74a is put on the lower pattern 59a. On the side of the lower pattern 59a, a key-shaped nut 151 is fitted. A ball screw 152 horizontal in the Y-direction is fitted to the nut 151. The ball screw 152 is supported on a frame 153. The ball screw 152 is driven and rotated by a motor 155 through a belt 154. When the motor 155 is driven and the ball screw 152 rotates, the first lower pattern 59a moves in the Y-direction between a pickup station a immediately beneath a first nozzle 84, and a blanking station b immediately beneath the upper pattern 58a, along the guide rail 60a.

Below the pickup station a of the first device P1 is disposed poke-up means 160 of the first device P1. This poke-up means 160 comprises a vertical cylinder 161, a frame 163 supported on a rod 162 of the cylinder 161, a motor 164 mounted on the frame 163, and a poking pin 165 coupled to the rotary shaft of the motor 164. On the back of the frame 163 is provided a slider 166. The slider 166 is fitted to a vertical guide rail 167.

In FIG. 6, when the first device P1 is blanked out of the first film carrier 74a at the blanking station b, the motor 155 is driven, and the ball screw 152 rotates, and the first lower pattern 59a moves from the blanking station b to the pickup pattern a. When the rod 162 of the cylinder 161 projects, the frame 163 ascends along the guide rail 167, and the pins 165 invades into the lower pattern 59a, thereby poking up the first device P1 of the lower pattern 59a (see chain line). Consequently, the first nozzle 84 sucks in vacuum and picks up the first device P1 poked up by the pin 165. Or with the pin 165 poking up the first device P1, the motor 164 is driven, and the first device P1, supported on the pin 165, is rotated horizontally by 90° or 180° to change the direction, and then the first nozzle 84 may pick up the first device P1. When the nozzle 84 picks up the device P1, the rod 162 of the cylinder 161 descends, and the pin 165 retreats downward.

In FIG. 1, also at the side of the second case 71b, the second cutting device 55b is the provided. The structure of the second cutting device 55b is same as that of the first cutting device 55a, and comprises second frame 56b, second cylinder 57b, second upper pattern 58b, second lower pattern 59b, and others. By the second upper pattern 58b and second lower pattern 59b, the second device P2 is blanked out of the second film carrier 74b. Beneath the second cutting device 55b is provided a poke-up means, same as the poke-up means 160 described above. The second device P2 positioned on the second lower pattern 59b, blanked out of the second film carrier 74b, is sucked in by vacuum and picked up by the second nozzle 85.

In FIG. 1, between the box 20 and box 69, a turntable 80 is provided. The turntable 80 is supported on a post 81. The post 81 is set up on a moving table 86 in the X-direction. Inside the moving table 86 are provided ball screw and nut (neither shown), and when the motor MX2 is driven, the turntable 80 moves on the moving table 86 in the X-direction.

On the turntable 80, a first arm 82 and a second arm 83 are cross orthogonally with each other and are held in a cross form. The front end of the first arm 82 is provided with a first nozzle 84 for sucking in vacuum and picking up the first device P1 on the first lower pattern 59a (See also FIG. 6). Similarly, the front end of the second arm 83 is provided with a second nozzle 85 for sucking in vacuum and picking up the second device P2 on the second lower pattern 59b. The first device P1 and second device P2 differ in dimension, and the first device P1 and second device P2 cannot be sucked in vacuum by the nozzle of same size. Accordingly, the first arm 82 and second arm 83 are provided on the turntable 80, the first nozzle 84 and second nozzle 85, differing in size, are held at both ends of the first arm 82 and second arm 83, the first device P1 is picked up by the first nozzle 84, and the second device P2 picked up by the second nozzle 85. As shown in FIG. 15a, inside the first arm 82, a motor 82a is incorporated as a rotating means for rotating the first nozzle 84 horizontally, so that the direction of the device P1 may be finely adjusted. Such rotating means is also provided in the second arm 83. In the embodiment, the rotating means 82a and the moving means 1 function as the positioning means for positioning the device electrodes (outer leads) and the electrodes on the display panel.

In FIG. 1, when the motor MX2 is driven and the turntable 80 slides to the left, the first nozzle 84 moves above the first lower pattern 59a (see also FIG. 14). In FIG. 1, meanwhile, when the turntable 80 is rotated by 90° horizontally, the second arm 83 is set in the Y-direction. Accordingly, the motor MX2 is driven and the turntable 80 slides to the right, and then the second nozzle 85 moves above the second lower pattern 59b (see also FIG. 18).

Also in FIG. 1, at the side of the base 5, a frame 90 is placed. The frame 90 comprises a first head 91a and a second head 91b. The first head 91a and second head 91b are designed to press and bond the outer leads L of the first device P1 and second device P2, while being sucked in by vacuum by the first nozzle 84 and second nozzle 85, to the electrodes 30a, 30b on the display panel 10. FIG. 7 is a perspective view of the first head 91a, and FIG. 8 is its sectional view. The first head 91a comprises a case 92, a vertical ball screw 93 provided in the case 92, and a nut 94 to be fitted to the ball screw 93. A slider 95 integrally formed on the nut 94 slides along a vertical guide rail 96 provided inside the case 92.

The ball screw 93 is engaged with a key-shaped bracket 97. The upper surface of the case 92 is fitted to the frame 90, and a motor 99a for rotating the ball screw 93 is mounted on the upper surface of the frame 90. Therefore, when the motor 99a is driven and the ball screw 93 rotates, the nut 94 ascends or descends along the ball screw 93. A cylinder 101 is provided on the lower surface of the frame 90. A rod 102 of the cylinder 101 is coupled with the shoulder of the bracket 97 through a fitting 103.

A slider 104 is provided on the inner surface of the bracket 97. The slider 104 is engaged with a guide rail 105 in the Z-direction provided on the outer surface of the case 92. Flanges 106, 107 project from the front surface of the bracket 97. A rod 108 is inserted in the flanges 106, 107. An indenter 109 of, in the shape of a long plate, is coupled to the lower end of the rod 108. On the outer surface of the bracket 97, a thermocompressive piece 111 is fitted. The lower surface height of the thermocompressive piece 11 is slightly higher than the lower surface height of the indenter 109. Inside the thermocompressive piece 111 is incorporated a cartridge heater 112, and the thermocompressive piece 111 is heated to about 110° C. by the cartridge heater 112. The indenter 109 holds the outer leads 1 temporarily on the electrode 30a, when the outer leads L are being bonded to the electrode 30a by means of the thermocompressive piece 111, and straightens the deformation of the outer leads Two rods 108, 108 are coupled with a plate 113 for determining the descending limit height of the indenter 109; the plate 113 being pressed to the upper surface of the flange 107 by means of coil springs 110, 110 mounted on the rods 108, 108.

The cylinder 101 always presses the bracket 97 against the upper surface of the nut 94 at a specific bonding load. That is, the cylinder 101 is the bonding load providing means. This bonding load can be varied freely. The motor 99a, ball screw 93, and nut 94 are elevating means for raising and lowering the thermocompressive piece 111, and adjusting the descending speed and height of the thermocompressive piece 111. The second head 91b is the same structure as the first head 91a, is provided on the frame 90, and is driven by the motor 99b, but the dimensions of the indenter 109 and thermocompressive piece 111 of the first head 91a and second head 91b are different depending on the dimensions of the first device P1 and second device P2. In this embodiment, the first head 91a and second head 91b are fixed on the frame 90. In the alternative the first head 91a and second head 91b may be provided on a movable table so as to be movable in the horizontal direction.

In FIG. 2 and FIG. 3 beneath the bonding station c, an observation device having a first camera 121 and a second camera 122 is provided. These cameras 121, 122 are to observe the position of the electrodes 30a, 30b on the display panel 10, and outer leads L of the devices P1, P2.

FIG. 10 is a perspective view of the observation device 120, and FIG. 11 is its sectional view. In the lower part of the first camera 121 and in the lower part of the second camera 122, a first nut 123 and a second nut 124 are provided. In the first nut 123 and second nut 124, a ball screw 125 in the X-direction is inserted. The ball screw 125 is cut with right-hand threads 126 and left-hand threads 127, and the first nut 123 is engaged with the right-hand threads 126, and the second nut 124 is engaged with the left-hand threads 127. The ball screw 125 is supported by a first frame 128. At the side of the frame 128, a motor 129 for rotating the ball screw 125 is provided. As the motor 129 is driven, the ball screw 125 is rotated, and the first camera 121 and second camera 122 move mutually in reverse directions along the ball screw 125, and the spacing of the first camera 121 and second camera 122 is adjusted. Specifically, the nuts 123, 124, ball screw 125, and motor 129 are spacing adjusting means for the first camera 121 and the second camera 122.

In the lower part of the first frame 128, a slider 131 is provided. This slider 131 is fitted with a guide frame 132 in the X-direction provided on the box 20 as shown in FIG. 2. Behind the first frame 128 is provided a second frame 133. A ball screw 134 in the X-direction is supported on this second frame 133. At the side of the second frame 133, a motor 135 for rotating the ball screw 134 is provided. The ball screw 134 is engaged with a nut 136 provided on the back of the first frame 128. Therefore, when the motor 135 is driven and the ball screw 134 rotates, the first frame 128 moves in the X-direction along the guide rail 132. Herein, when the motor 135 rotates normally, the cameras 121, 122 move downward of the first head 91a shown in FIG. 3 and FIG. 14, and monitor the electrode 30a of the display panel 10 and the outer lead L of the first device P1, which is to be sucked in by vacuum to the lower end of the first nozzle 84 and bonded to the display panel 10. When the motor 135 rotates in reverse the cameras 121, 122 move downward of the second head 91b shown in FIG. 18, and monitor the electrode 30b of the display panel 10 and the outer lead L of the second device P2, which is sucked in by vacuum to the lower end of the second nozzle 85 and bonded to the display panel 10.

In FIGS. 10 and 11, in the upper part of the first camera 121 and second camera 122, a long lens barrel 141 in the X-direction is provided. Inside the lens barrel 141, a light source 142, a half mirror 143, and a mirror 144 are provided. Above the mirror 144 is opened a window 145. Through the window 145, the electrodes 30a, 30b of the display panel 10 and the outer leads L of the devices P1, P2 are observed. By moving the first frame 128 in the X-direction by driving the motor 135, the two cameras 121, 122 are located beneath the outer leads L. The width W of the outer lead L varies with the type of the devices being bonded. Therefore, depending on the width W, the motor 129 is driven, and the first camera 121 and second camera 122 are moved in mutually reverse directions along the ball screw 125, and the spacing D is adjusted so that the window 145 and window 145 may be positioned beneath the both ends of the outer leads L.

The foregoing is a description of the first embodiment of the invention. Next, the entire operation is described below. First is explained the process of bonding the outer lead L of the first device P1 to the electrode 30a on the longer side of the display panel 10. Referring to FIG. 13(a), (b), (c), the electrode 30a on the longer side of the display panel 10 is moved to immediately beneath the thermocompressive piece 111 of the first head 91a. By the transfer device, not shown, the display panel 10 is transferred onto the θ-table 4. Then, by driving the motors MXI, MYI (FIG. 1), the display panel 10 is moved in the X-direction or Y-direction, and the marginal area of the display panel 10 is moved above the third long plate 44 (FIG. 13(a)). In this case, as shown in FIG. 19(a), the marginal area of the display panel 10 is projected from the third long plate 44 by a specified length d1, so that the electrode 30a of the display panel 10 may be observed by the observation device 120. At this time, the third long plate 44 is set back downward so as not to disturb the move of the display panel 10.

Driving the motor MXb (FIG. 1), the plate 21b shown in FIG. 3 is moved in the X-direction. Consequently, the roller 33b is pushed up to the plate cam 34b, and the pole 26b is raised, and the third long plate 44 abuts against the lower surface of the side of the display panel 10, thereby sucking in vacuum and fixing the display panel 10 by the suction hole 45 (FIG. 13(b)). The motor MYI (FIG. 1) is driven again to move the display panel 10 horizontally, and the electrode 30a on the longer side is positioned in the viewing field of the first camera 121 and second camera 122 (see FIG. 13(c)). At this time, as shown in FIG. 9, the suction section 12 of the θ-table 4 and the third long plate 44 are coupled by means of the display panel 10. Accordingly, when the θ-table 4 is moved in the direction of arrow N, the third long plate 44 also moves horizontally in the N-direction together with the display panel 10.

Next the blanking method of the first film carrier 74a is described. In FIG. 1 and FIG. 5, as the first feed reel 72a, first take-up reel 73a, and sprocket 87 rotate in the arrow direction, the film carrier 74a is led out beneath the upper pattern 58a. At this time, the lower pattern 59a slides along the guide rail 60a, and is positioned at the blanking station b immediately beneath the upper pattern 58a(see chain line in FIG. 6). When the first cylinder 57a operates, the first upper pattern 58a descends, and the film carrier 74a is blanked by the first upper pattern 58a and first lower pattern 59a.

The rod of the first cylinder 57a retracts and the upper pattern 58a moves upward, and the first feed reel 72a and sprocket 87 rotate. Then the first film carrier 74a is fed by one pitch and is covered in the box 69. The first lower pattern 59a, on which the first device P1 blanked out of the film carrier 74a is mounted, moves up to the pickup station a indicated by solid line in FIG. 1 and FIG. 6 along the guide rail 60a. FIG. 14 shows a plan view of the operation at this time. At this time, as the motor MX2 shown in FIG. 1 is driven, the turntable 80 moves in the X-direction, and the first nozzle 84 at the front end of the first arm 82 waits above the first lower pattern 59a, that is, at the position shown in FIG. 6 and FIG. 14 preliminarily.

As explained by reference to FIG. 6, as the rod 162 of the cylinder 161 projects, the pin 165 pokes up the first device P1 on the lower pattern 59a from beneath, and the first nozzle 84 sucks in vacuum and picks up the first device P1.

Next, in FIG. 14, the turntable 80 rotates horizontally by 180° in the arrow direction, and moves the first device P1 sucked in by vacuum by the first nozzle 84, to above the electrode 30a on the longer side of the display panel 10 (see FIG. 3). In this embodiment, by rotating the turntable 80 while holding the nozzles 84, 85 on the turntable 80, the devices P1, P2 are moved from the pickup station b to the bonding station c, but instead of the turntable 80, by holding the nozzles 84, 85 on the table moving linearly to move the nozzles 84, 85 linearly, the devices P1, P2 may be moved from the pickup station e to the bonding station c.

Next, is described the method of bonding the first device P1, sucked in by vacuum by the first nozzle 84 to the electrode 30a on the display panel 10 by reference to FIGS. 15, 16 and 17. FIGS. 15 to 17 refer to a series of actions.

In the state shown in FIG. 15(a), the first device P1 on the first lower pattern 59a is picked up, the first arm 82 is rotated 180°, and the outer lead L of the first device P1, sucked in by vacuum by the first nozzle 84 is positioned immediately above the window 145 of the lens barrel 141 of the first camera 121 and second camera 122. Herein, as indicated by chain line in the diagram, the indenter 109 is lowered, the outer lead L is pressed against the electrode 30a, and the outer lead L and electrode 30a are observed by the first camera 121 and second camera 122. As shown in FIG. 12(a), the left end of the outer lead L is taken into the viewing field A of the first camera 121. The right end is taken into the viewing field B of the second camera 122. FIG. 12(b), (c) are magnified views of the viewing fields A and B, showing how the deviations $\Delta X$, $\Delta Y$, $\Delta \theta$ of the outer lead L and electrode 30a in the X, Y, and θ directions are detected. The detected position deviations $\Delta X$, $\Delta Y$, $\Delta \theta$ are corrected as follows.

As shown in FIG. 15(b), the arm 82 is raised by elevating means not shown, the nozzle 84 is slightly rotated in the θ-direction by the motor 82a as the rotating means built in the arm 82, and the position deviation $\Delta \theta$ in the θ-direction is corrected. In this state, by driving the motors MX1, MY1 (FIG. 1), the display panel 10 is moved in the X-direction or Y-direction, so that the position deviation $\Delta X$ in X-direction and position deviation $\Delta Y$ in Y-direction are corrected.

After thus correcting the position deviations $\Delta X$, $\Delta Y$, $\Delta \theta$, the first nozzle 84 is lowered to set the outer lead L don on the electrode 30a of the display panel 10, and the indenter 109 is then lowered to press the outer lead L1 to the electrode 30a, thereby correcting the deformation of the outer lead L (see FIG. 16(a)). In this state, it is detected by the first camera 121 and second camera 122 whether the outer lead L and electrode 30a are matched or not. This method of detection is same as the method shown in FIG. 12. When the position deviation between the outer lead L and the electrode 30a is within the tolerance, the thermocompressive piece 111 is directly lowered to press the outer lead L against the electrode 30a to bond the lead and the electrode (see chain line in FIG. 16(a)).

Incidentally, in the outer lead bonding, the required precision in the X-direction (parallel direction of outer lead L) is much stricter than the precision in the Y-direction or θ-direction. Accordingly, when the position deviation $\Delta X$ in the X-direction of the outer lead L and electrode 30a is more than or exceeds the tolerance, this position deviation $\Delta X$ is corrected again in the following manner. That is, as shown in FIG. 16(b), by driving the motor MXa (FIG. 2) to push up the plate 21a in FIG. 3, the pole 26a is raised, and the device P1 is pushed up by the first long plate 28. Herein, the motor MX1 is driven to move the display panel 10 in the X-direction, and the position deviation $\Delta X$ is corrected. Next, the first long plate 28 is lowered to the initial height, and the outer lead L, and electrode 30a are overlapped, and then the thermocompressive piece 111 is lowered to bond the outer lead L to the electrode 30a(see FIG. 17). This bonding is done as follows. That is, the ball screw 93 is rotated by the motor 99a, and the nut 94, bracket 97, and thermocompressive piece 111 are lowered according to the specified speed pattern. When the thermocompressive piece 111 lands on the outer lead L, the descent of the thermocompressive piece 111 and bracket 97 stops, but the nut 94 further descends. In this state, the bonding load generated by the cylinder 101 is applied to the outer lead L through the rod 102, bracket 97 and thermocompressive piece 111. In this way, after bonding the first device P1 to the first bonding position 10L on the longer side of the display panel 10, in FIG. 1, the motor MX1 of the X-table 2 is driven to move the display panel 10 in the X-direction by the portion of the pitch of the bonding position 10L, and the next first device P1 is bonded to the adjacent bonding position 10L of the first device P1 bonded first. In this way, by repeating the series of actions shown in FIGS. 15 to 17, the first devices P1 are successively bonded at the bonding positions 10L on the longer side of the display panel 10. In this case, since the plural bonding positions 10L on the longer side of the display panel 10 are supported from beneath by the third long plate 44, it is not necessary to lower the third long plate 44 every time one device is bonded as required in the prior art, so that the bonding job may be done continuously and at high speed.

After bonding the first devices P1 to the electrodes 30a on the longer side of the display panel 10, second devices P2 are bonded to the electrodes 30b on the shorter side. FIG. 18 shows the mode of bonding the outer lead L of the second device P2 to the electrode 30b on the shorter side of the display panel 10. In this case, the vacuum suction state of the third long plate 44 by the suction hole 45 is canceled, and the third long plate 44 is lowered, and then the display panel 10 is rotated horizontally by 90° of the θ-table 4 shown in FIG. 2, and the shorter side of the display panel 10 is moved above the third long plate 44 as shown in FIG. 19(b). Also by driving the motor MY1, the shorter side is projected by a specified length d2 from the third long plate 44, and the third long plate 44 is raised again and fixed by suction in vacuum by the suction hole 45. Driving the motor MX2, the turntable 80 is moved in the X-direction (right direction), and the second nozzle 85 at the front end of the second arm 83 is positioned above the second lower pattern 59b. By driving the motor 129 in FIG. 10, the two windows 145 arc positioned below the both sides of the outer lead L.

The method of bonding the second device P2 to the shorter side of the display panel 10 is same as the method of bonding the first device P1 to the longer side of the display panel 10, and its explanation is omitted. When all of the first devices P1 and second devices P2 are bonded to the longer side and shorter side of the display panel 10, respectively, the vacuum suction state of the display panel 10 by the suction hole of the θ-table (FIG. 2) and the suction hole 45 of the third long plate 44 is canceled, and the display panel 10 is removed from the θ-table 4 by the transfer device not shown. A new display panel 10 is put on the θ-table 4, and the first devices P1 and second devices P2 are bonded to this display panel 10 in the same manner as mentioned above.

In this way, by supporting the middle of the display panel 10 by the θ-table 4, and changing the distance between the θ-table 4 and the third long plate 44 in the horizontal direction by means of the motor MY1, bonding of the devices P1, P2 on the bonding positions on the longer side and shorter side of the display panel can be done automatically.

Figure 20:
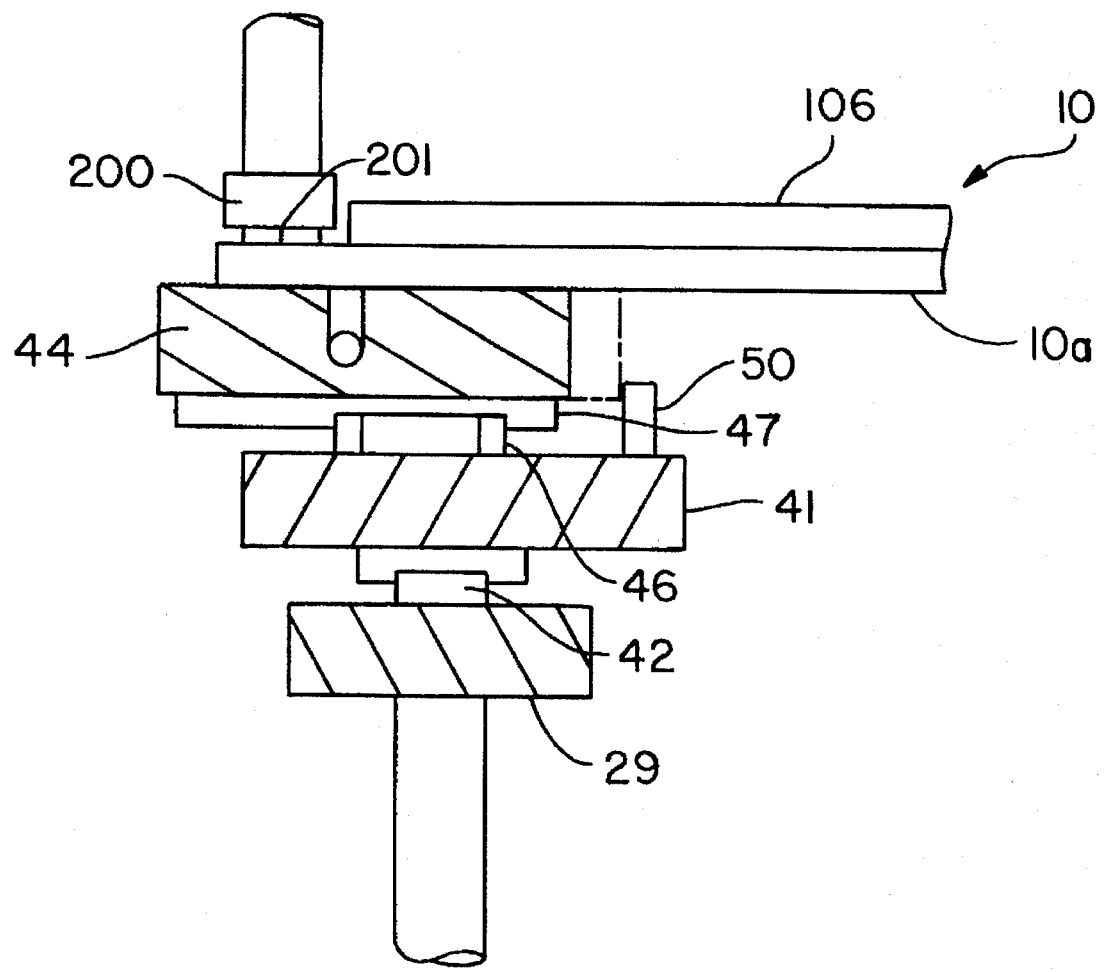
FIG. 20 is a partial sectional view in a process of bonding an ACF of a device boding apparatus in a second embodiment of the invention.
Figure 21:
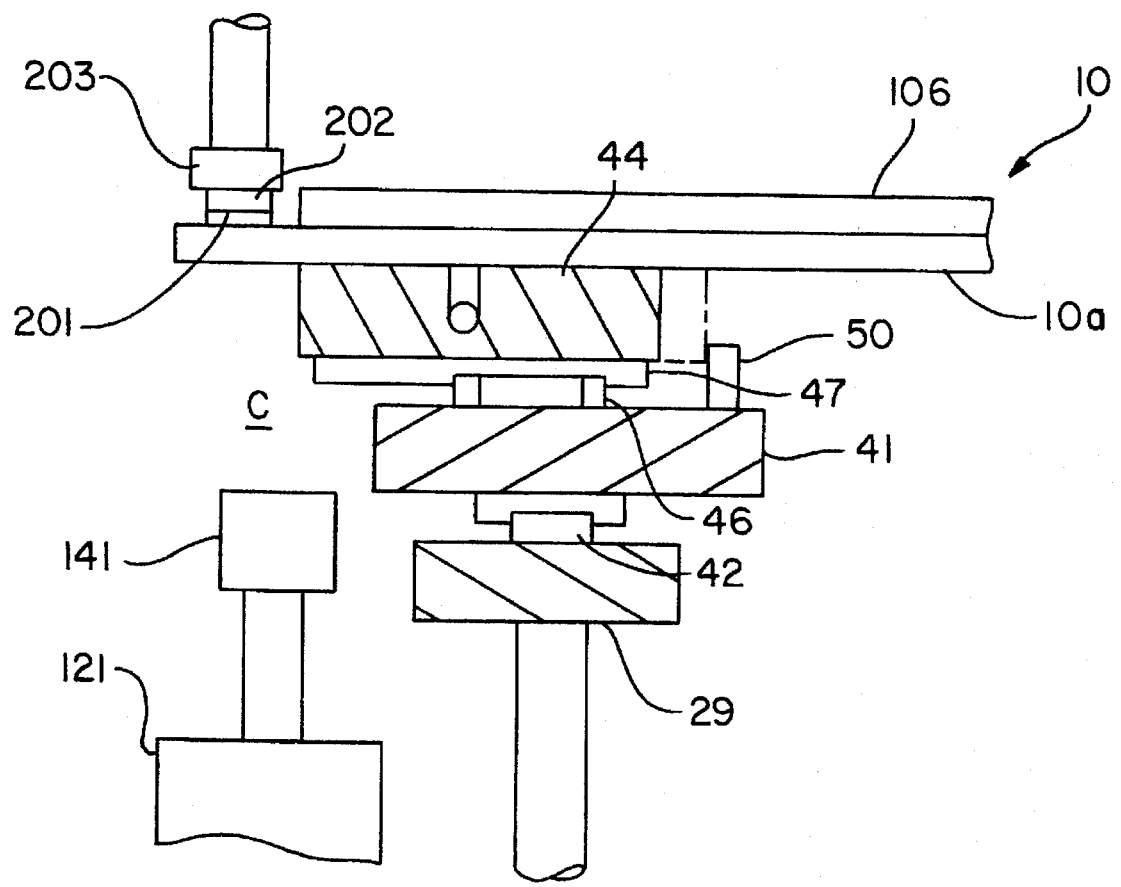
FIG. 21 is a partial sectional view in a process of bonding a flip chip of the device bonding apparatus in the second embodiment of the invention.

Another embodiment of the invention as shown in FIG. 20 and 21, is described below. FIG. 20 is a partial sectional view of a device bonding apparatus, according to a second embodiment of the invention, using an ACF, and FIG. 21 is an essential sectional view of the same device bonding apparatus used in bonding flip chips. First, as shown in FIG. 20, an ACF (anisotropic conductive film) 201 is sucked in by vacuum to a nozzle 200, and is bonded to the electrode 30a on the longer side of a lower plate 10a of the display panel 10. At this time, the marginal area of the lower plate 10a is supported from beneath by the third long plate 44. Next, driving the θ-table 4, the display panel 10 is rotated by 90°, and similarly the marginal area of the shorter side of the lower plate 10a is supported from beneath by the third long plate 44, and the ACF 201 is bonded on the electrode 30b.

After bonding the ACF 201 in this manner, a flip chip as a device is bonded on this ACF 201. FIG. 21 shows the flip chip bonding manner or process. As shown in the diagram, the flip chip 202 is sucked in by vacuum to a collet 203, and is bonded on the ACF 201. In this case, as shown in FIG. 21, by the first camera 121 or second camera 122, the bump (electrode) formed on the lower surface of the flip chip 202 and the electrode 30a on the longer side of the lower plate 10a are observed, the bump and electrode 30a are positioned according to the result of observation, and the flip chip 202 is bonded on the ACF 201. In this case, too, the vicinity of the marginal area of the lower plate 10a is supported from beneath by the third long plate 44.

Next, by driving the θ-table 4, the display panel 10 is rotated by 90°, and similarly, the flip chip is bonded on the ACF 201 bonded on the electrode 30b on the shorter side. When bonding the flip chip, only one camera is enough, and the first head 91a and second head 91b shown in FIG. 3 are not necessary. In this way, the invention is applied in the bonding apparatus for bonding not only the device manufactured by TAB method, but also the flip chip.

Advantages

As explained herein, the invention brings about the following advantages.

(1) The plural bonding positions provided on the marginal area of the display panel are supported from beneath by the third long plate, and therefore a plurality of devices can be bonded continuously while maintaining the support state of the display panel by the third long plate, so that the bonding job on one side can be done efficiently and at high speed.

(2) The position deviation of the electrode of the display panel and the outer lead of the device is detected in the state of supporting the marginal area of the display panel by the third long plate, and therefore positioning is achieved in consideration of the position deviation occurring when the third long plate abuts against the display panel, so that bonding of high precision is realized.

(3) The middle of the display panel is supported by the θ-table, and the distance between this θ-table and the third long plate in the horizontal direction is adjusted by the Y-table having a motor, and therefore the direction of the display panel is changed by the θ-table and the lower part of the marginal area of the bonding station side is accurately supported by the third long plate, so that bonding on different marginal areas of the display panel can be done automatically and continuously. It is easily flexible to changes of size of the display panel, too.

(4) Comprising two types each of the feed section for feeding the film carrier, cutting device for blanking a device out of the film carrier, nozzle for transferring the device to above the display panel, and head for bonding the outer lead of the device to the electrode of the display panel, first devices and second devices differing in type can be automatically bonded on longer side and shorter side of the display panel.

Of course, it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of the invention.

What is claimed is:

1. A device bonding apparatus, being a bonding apparatus for bonding a second electrode formed on a device by positioning on first electrodes formed on plural bonding positions in a marginal area of a display panel, comprising:

(a) a first support section for supporting the middle of the display panel from beneath, (b) a second support section for supporting the plural bonding positions in a marginal area of the display panel from beneath, the second support section being separated from the first support section, (c) positioning means for positioning the second electrode of the device on the first electrode formed in one of the plural bonding positions in the marginal area of the display panel, (d) bonding means for bonding the positioned device by pressing on the display panel, and (e) distance changing means for changing the distance between the first support section and second support section in the horizontal direction.

2. A device bonding apparatus of claim 1, wherein the bonding means of (d) is bonding means for bonding the positioned second electrode of the device by pressing against the first electrode at the bonding position of the display panel.

3. A device bonding apparatus of claim 1, further comprising means for moving the first support section horizontally together with the second support section.

4. A device bonding apparatus of claim 1, the first support section is a θ-table device for rotating horizontally by supporting the middle of the display panel.

5. A device bonding apparatus of claim 4, wherein the distance changing means is a Y-table for moving the θ-table device toward the second support section.

6. A device bonding apparatus of claim 1, further comprising elevating driving means for moving up and down the second support section in order to support and release the bonding position of the display panel.

7. A device bonding apparatus comprising:

(a) a first support section for supporting the display panel from beneath, (b) a second support section for exposing the marginal area of the display panel, and supporting the bonding position of the marginal area from beneath, the second support section being separated from the first support section, (c) an observation device for observing the exposed marginal area of the display panel from beneath, with the marginal area of the display panel being supported by the second support section, (d) positioning means for positioning a second electrode and a first electrode, on the basis of the position deviation between the first electrode formed on the display panel and the second electrode formed on the device, being detected by the observation device, (e) bonding means for bonding the positioned device by pressing against the display panel, and (f) distance changing means for changing the distance between the first support section and second support section in the horizontal direction.

8. A device bonding apparatus of claim 7, wherein the bonding means of (e) is bonding means for bonding the positioned second electrode of the device by pressing against the first electrode at the bonding position of the display panel.

9. A device bonding apparatus of claim 7, wherein the observation device comprises two cameras, and simultaneously observes two positions by the individual viewing fields of the cameras.

10. A device bonding apparatus of claim 9, wherein the observation device further comprises spacing adjusting means for adjusting the spacing between the viewing field and the viewing field.

11. A device bonding apparatus of claim 7, wherein the positioning means comprises:

moving means for moving the display panel relatively to the device, in order to correct the position deviation of the first electrode of the display panel and the second electrode of the device detected by the observation device, and rotating means for rotating horizontally the nozzle for sucking the device in vacuum.

12. A device bonding apparatus of claim 11, wherein the moving means comprises:

an X-table device for moving the display panel in the X-direction, a Y-table device for moving in the Y-direction, and a θ-table device for moving in the θ-direction.

13. A device bonding apparatus comprising:

(a) moving means for moving a display panel horizontal, (b) a support section for supporting plural bonding positions formed in a marginal area of the display panel from beneath, (c) elevating driving means for supporting the marginal area of the display panel from beneath, and moving the support section up and down in order to cancel the support state, (d) a nozzle for sucking a device in vacuum, and positioning a second electrode formed in the device near a first electrode formed at the bonding position of the display panel, (e) an observation device for observing the positions of the first electrode and second electrode, beneath the bonding position, and (f) a head for bonding the device to the display panel by raising or lowering a thermocompressive piece, at the bonding position.

14. A device bonding apparatus of claim 13, wherein the head of (f) is a head for bonding the second electrode of the device to the first electrode at the bonding position of the display panel, by raising or lowering the thermocompressive piece, at the bonding position.

15. A device bonding apparatus comprising:

(a) moving means comprising an X-table device for moving a display panel horizontally in the X-direction and a Y-table device for moving horizontally in the Y-direction, (b) a first feed section for feeding a first film carrier having a first device, (c) a second feed section for feeding a second film carrier having a second device, (d) a first cutting device for blanking the first film carrier supplied from the first feed section by means of a first upper pattern and a first lower pattern, (e) a second cutting device for blanking the second film carrier supplied from the second feed section by means of a second upper pattern and a second lower pattern, (f) a first nozzle for picking up by sucking in vacuum the first device blanked by the first cutting device, (g) a second nozzle for picking up by sucking in vacuum the second device blanked by the second cutting device and positioned above the second lower pattern, (h) a first head for bonding the outer lead of the first device picked up by the first nozzle to the first electrode on one side of the display panel, (i) a second head for bonding the outer lead of the second device picked up by the second nozzle to the first electrode on the other side of the display panel, (j) a θ-table device for supporting the middle of the display panel beneath, (k) a support section for supporting the plural bonding positions in a marginal area of the display panel from beneath, wherein in a state that the one side of the display panel is supported by the support section, the outer lead of the first device is bonded to the first electrode on the one side of the display panel by the first head, the display panel is rotated horizontally by driving of the θ-table device, and in this state the other side of the display panel is supported by the support section, and the outer lead of the second device is bonded to the other side of the display panel by the second head.

16. A device bonding method, being a bonding method for bonding second electrodes formed on a device respectively to first electrodes at plural bonding positions formed on one marginal area of a display panel, comprising:

(a) a step of transferring the middle of the display panel on a first support section, (b) a step of supporting lower part of the plural bonding positions formed in the marginal area of the display panel, by a second support section, (c) a Step of positioning the second electrodes of the device to the first electrode at one of the plural bonding positions of the display panel, in a state that the lower part of the plural bonding positions is supported by the second support section, (d) a step of bonding the positioned device to the display panel, in a state that the lower part of the plural bonding positions is supported by the second support section, and (e) a step of bonding the second electrode of other device to the first electrodes at the remaining bonding positions in the marginal area by repeating steps (c) and (d).

17. A device bonding method of claim 16, wherein the bonding step of (d) is a step of bonding the positioned second electrode of the device to the first electrodes at the bonding positions of the display panel.

18. A device bonding method of claim 16, herein the step (c) is to position the first electrode and the second electrode, by supporting the marginal area of the display panel in a state projected from the second support unit, and observing the first electrode in the projected marginal area and the second electrode of the device from beneath by a camera.

19. A device bonding method, being a bonding method for bonding second electrodes formed on a device, to first electrodes at plural bonding positions formed on plural marginal areas of a display panel, comprising:

(a) a step of transferring the middle of the display panel on a first support section, (b) a step of supporting the lower part of the plural bonding positions formed on one marginal area of the display panel, by a second support section, (c) a step of positioning the second electrodes of the device to the first electrode at one of the plural bonding positions of the display panel supported by the second support section, in a state that the lower part of the plural bonding positions is supported by the second support section, (d) a step of bonding the positioned device by pressing against the display panel, in a state that the lower part of the plural bonding positions is supported by the second support section, (e) a step of bonding a device to the remaining bonding positions in the one marginal area, by repeating steps (c) and (d), (f) a step of clearing the support of the one marginal area by the second support section after step (e), (g) a step of supporting the lower part of the plural bonding positions formed in the other marginal area of the display panel, by the second support section, and (h) a step of bonding a device to the plural bonding positions in the other marginal area, in the same procedure as steps (c), (d) and (e).

20. A device bonding method of claim 19, wherein the bonding step of (d) is a step of bonding the positioned second electrode of the device to the first electrodes at the bonding positions of the display panel, and the bonding step of (h) is a step of bonding the positioned second electrode of the device to the first electrodes at the plural bonding positions in the other marginal area of the display panel.

21. A device bonding method of claim 19, wherein the step (c) is to position the first electrode and second electrode, by supporting the marginal area of the display panel in a state projected from the second support section and observing the first electrode in the projected marginal area and the second electrode of the device from beneath by a camera.

22. A device bonding method, being a bonding method for bonding a second electrode formed in a first device and a third electrode formed in a second device which are different in type, to first electrodes at plural bonding positions formed on plural marginal areas of a display panel, comprising:

(a) a step of transferring the middle of the display panel by a first support section, (b) a step of supporting the lower part of plural bonding positions formed on one marginal area of the display panel, by a second support section, (c) a step of positioning the second electrode of the first device to the first electrode at one of the plural bonding positions of the display panel supported by the second support section, ia a state that the lower part of the plural bonding position is supported by the second support section, (d) a step of bonding the positioned first device to the display panel, in a state that the lower part of the plural bonding position is supported by the second support section.

(e) a step of bonding a first device to the remaining bonding positions on one marginal area, by repeating steps (c) and (d), (f) a step of clearing the support of the one marginal area by the second support section after step (e), (g) a step of supporting the lower part of the plural bonding positions formed on other marginal area of the display panel, by the second support section and, (h) a step of bonding a second device at the plural bonding positions on the other marginal area, in the same procedure as steps (c), (d) and (e).

23. A device bonding method of claim 22, wherein the bonding step of (d) is a step of bonding the positioned second electrode of the first device to the first electrodes at the bonding positions of the display panel, and the bonding step of (h) is a step of bonding the positioned third electrode of the second device to the first electrodes at the plural bonding positions in the other marginal area of the display panel.

24. A device bonding method of claim 22, wherein the step (c) is to position the first electrode and second electrode, by supporting the marginal area of the display panel in a state projected from the second support section, and observing the first electrode in the projected marginal area and the second electrode of the first device from beneath by a camera.

* * * * *

UNITED STATES PATENT AND TRADEMARK OFFICE
CERTIFICATE OF CORRECTION

PATENT NO.  :  5,628,660
DATED       :  May 13, 1997
INVENTOR(S) :  Yasuto ONITSUKA It is certified that error appears in the above-indentified patent and that said Letters Patent is hereby corrected as shown below:

Col. 17,    Line 33, After "supporting" insert --a--

Col. 17,    Line 36, Delete "Step" and insert --step--

Col. 18,    Line 33, After "section" insert --,--

Col. 18,    Line 49, Delete "ia" and insert --in--

Signed and Sealed this

Twenty-second Day of September, 1998

Attest:

BRUCE LEHMAN

*Attesting Officer*    *Commissioner of Patents and Trademarks*